(12) United States Patent
Oami et al.

(10) Patent No.: US 11,158,068 B2
(45) Date of Patent: *Oct. 26, 2021

(54) INFORMATION PROCESSING APPARATUS, CONTROL METHOD, AND PROGRAM

(71) Applicant: NEC CORPORATION, Tokyo (JP)

(72) Inventors: Ryoma Oami, Tokyo (JP); Katsuhiko Takahashi, Tokyo (JP); Yusuke Konishi, Tokyo (JP); Hiroshi Yamada, Tokyo (JP); Hiroo Ikeda, Tokyo (JP); Junko Nakagawa, Tokyo (JP); Kosuke Yoshimi, Tokyo (JP); Ryo Kawai, Tokyo (JP); Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 16/444,531

(22) Filed: Jun. 18, 2019

(65) Prior Publication Data

US 2020/0065982 A1   Feb. 27, 2020

Related U.S. Application Data

(63) Continuation of application No. 16/085,851, filed as application No. PCT/JP2017/002711 on Jan. 26, 2017, now Pat. No. 10,699,422.

(30) Foreign Application Priority Data

Mar. 18, 2016   (JP) .................................. 2016-055171

(51) Int. Cl.
*G06T 7/292* (2017.01)
*G06T 7/269* (2017.01)
(Continued)

(52) U.S. Cl.
CPC .......... *G06T 7/292* (2017.01); *G06K 9/00348* (2013.01); *G06K 9/00778* (2013.01);
(Continued)

(58) Field of Classification Search
CPC ............ G06K 9/00348; G06K 9/00778; G06T 1/0007; G06T 7/20; G06T 7/269;
(Continued)

(56) References Cited

U.S. PATENT DOCUMENTS 8,867,892 B2   10/2014  Li et al.
8,917,764 B2 * 12/2014  Gupta ..................... G06T 7/215
                                                375/240.02

(Continued)

FOREIGN PATENT DOCUMENTS

JP   2003-348569 A   12/2003
JP   2006-197226 A   7/2006
(Continued)

OTHER PUBLICATIONS

Hung et al., "Real-Time Counting people in Crowded Areas by Using Local Empirical Templates and Density Ratios", IEICE Trans. INF. & SYST., Jul. 2012, vol. E95-D, No. 7, pp. 1791-1803 (total 13 pages).

(Continued)

*Primary Examiner* — Mekonen T Bekele
(74) *Attorney, Agent, or Firm* — Sughrue Mion, PLLC

(57) ABSTRACT

An information processing apparatus (2000) includes a first analyzing unit (2020), a second analyzing unit (2040), and an estimating unit (2060). The first analyzing unit (2020) calculates a flow of a crowd in a capturing range of a fixed camera (10) using a first surveillance image (12). The second analyzing unit (2040) calculates a distribution of an attribute of objects in a capturing range of a moving camera (20) using a second surveillance image (22). The estimating
(Continued)

unit (2060) estimates an attribute distribution for a range that is not included in the capturing range of the moving camera (20).

12 Claims, 22 Drawing Sheets

(51) Int. Cl.
| | |
|---|---|
| *H04N 7/18* | (2006.01) |
| *G06K 9/00* | (2006.01) |
| *H04N 5/232* | (2006.01) |
| *G06T 7/20* | (2017.01) |
| *G06T 1/00* | (2006.01) |
| *H04N 5/247* | (2006.01) |

(52) U.S. Cl.
CPC .............. *G06T 1/0007* (2013.01); *G06T 7/20* (2013.01); *G06T 7/269* (2017.01); *H04N 5/23229* (2013.01); *H04N 5/247* (2013.01); *H04N 7/181* (2013.01); *H04N 7/185* (2013.01); *G06T 2207/20076* (2013.01); *G06T 2207/20081* (2013.01); *G06T 2207/30196* (2013.01); *G06T 2207/30232* (2013.01); *G06T 2207/30242* (2013.01)

(58) Field of Classification Search
CPC ........... G06T 7/292; G06T 2207/20076; G06T 2207/20081; G06T 2207/30196; G06T 2207/30232; G06T 2207/30242; H04N 5/23229; H04N 5/247; H04N 7/181; H04N 7/185
See application file for complete search history.

(56) References Cited

U.S. PATENT DOCUMENTS

| | | | |
|---|---|---|---|
| 9,208,386 | B1 | 12/2015 | Kobold |
| 9,712,980 | B1 | 7/2017 | Filatoff |
| 9,875,431 | B2 | 1/2018 | Ikeda |
| 2004/0257444 | A1 | 12/2004 | Maruya et al. |
| 2007/0031005 | A1 | 2/2007 | Paragios et al. |
| 2009/0222388 | A1 | 9/2009 | Hua et al. |
| 2010/0124357 | A1 | 5/2010 | Hampapur et al. |
| 2012/0077172 | A1* | 3/2012 | Watanabe ........ H04N 21/44008 434/308 |
| 2012/0188545 | A1 | 7/2012 | Funayama et al. |
| 2012/0249812 | A1 | 10/2012 | Li et al. |
| 2013/0197912 | A1* | 8/2013 | Hayakawa .......... H04M 3/2281 704/246 |
| 2014/0003724 | A1* | 1/2014 | Feris ...................... G06T 7/254 382/197 |
| 2014/0368601 | A1 | 12/2014 | Decharms |
| 2014/0379477 | A1 | 12/2014 | Sheinfeld et al. |
| 2015/0032418 | A1 | 1/2015 | Akiyama et al. |
| 2015/0058971 | A1 | 2/2015 | Mori |
| 2015/0158426 | A1 | 6/2015 | Sonoda |
| 2015/0334523 | A1 | 11/2015 | Lappetelainen et al. |
| 2016/0292533 | A1 | 10/2016 | Uchiyama et al. |
| 2016/0379074 | A1 | 12/2016 | Nielsen et al. |
| 2017/0017846 | A1 | 1/2017 | Felemban et al. |
| 2017/0220871 | A1 | 8/2017 | Ikeda |
| 2018/0033153 | A1 | 2/2018 | Hirasawa et al. |
| 2018/0332424 | A1* | 11/2018 | Edry ...................... H04S 7/304 |
| 2019/0122228 | A1* | 4/2019 | Konishi .................. G06T 7/74 |
| 2019/0238786 | A1 | 8/2019 | Takahashi |
| 2019/0325589 | A1 | 10/2019 | Oami et al. |
| 2020/0050872 | A1 | 2/2020 | Ikeda |
| 2020/0143171 | A1 | 5/2020 | Lee et al. |

FOREIGN PATENT DOCUMENTS

| | | |
|---|---|---|
| JP | 2008-217184 A | 9/2008 |
| JP | 2012-033142 A | 2/2012 |
| JP | 2012-173761 A | 9/2012 |
| JP | 2014-517371 A | 7/2014 |
| KR | 101448391 B1 | 10/2014 |
| WO | 2014/207991 A1 | 12/2014 |
| WO | 2016/002400 A1 | 1/2016 |

OTHER PUBLICATIONS

Notice of Allowance for U.S. Appl. No. 16/085,851 dated Feb. 26, 2020.
International Search Report of PCT/JP2017/002711 dated Apr. 11, 2017.
Shinji Miyazaki et al., "Gunshu Kodo Kaiseki Gijutsu o Mochiita Konzatsu Suitei System", NEC Technical Journal, Nov. 14, 2014, pp. 82-85, vol. 67, No. 1, ISSN 0285-4139.
U.S. Office Action for U.S. Appl. No. 16/444,642 dated Mar. 18, 2021.
U.S. Office Action and PTO-892 for U.S. Appl. No. 16/444,417 dated Jan. 25, 2021.
U.S. Office Action for U.S. Appl. No. 16/444,642 dated Jul. 26, 2021.
U.S. Office Action for U.S. Appl. No. 16/444,417 dated Jul. 7, 2021.
Ke Chen et al., "Cumulative Attribute Space for Age and Crowd Density Estimation", 2013 IEEE Conference on Computer Vision (Year: 2013), pp. 2467-2474.

* cited by examiner

TIME t0

TIME t1

TIME t2

INFORMATION PROCESSING APPARATUS, CONTROL METHOD, AND PROGRAM

CROSS REFERENCE TO RELATED APPLICATIONS

This application is a Continuation of U.S. application Ser. No. 16/085,851, filed on Sep. 17, 2018, which is a National stage of International Application No. PCT/JP2017/002711 filed on Jan. 26, 2017, which claims priority benefit from JP 2016-055171 filed on Mar. 18, 2016, the contents of which are incorporated herein by reference.

TECHNICAL FIELD

The present invention relates to video surveillance.

BACKGROUND ART

Technologies for analyzing a video of a surveillance camera have been developed. For example, Patent Document 1 discloses a technique for surveilling the congestion degree and the like in a certain space by recognizing the number, density, average velocity, and average motion vector of people and the like in a crowd using a video of a surveillance camera.

RELATED DOCUMENT

Patent Document

[Patent Document 1] Japanese Patent Application Publication No. 2003-348569
[Patent Document 2] International Publication No. 2014/207991
[Patent Document 3] Japanese Unexamined Patent Application Publication (Translation of PCT Application) No. 2014-517371

SUMMARY OF THE INVENTION

Technical Problem

In the technique of Patent Document 1, a crowd is handled as a collection of the same things without distinguishing people included in the crowd from each other. Thus, it is impossible to grasp what kind of people are included in the crowd using the technique of Patent Document 1. In addition, the technique of Patent Document 1 is a technique for detecting a person or a thing (or a collection of people or things) by individually separating the person or the thing. Thus, in a state of a crowd where people cannot be individually separated from each other easily due to a large number of people, it is difficult to correctly determine the number of people or the like.

Patent Document 2 discloses a method of recognizing a crowd as a mass without separating each person in the crowd of people. When this method is used, the number or density of people can be estimated in a state where people overlap each other. However, as in Patent Document 1, since the crowd is treated as a mass of the same things, it is impossible to grasp what kind of people are included in the crowd.

On the other hand, Patent Document 3 discloses a method of selecting an advertisement to be provided to a person by estimating attribute information such as the age, the sex, and the like of the person. In the technique of Patent Document 3, merely a part of a person such as a face is recognized. Thus, the position of the person cannot be accurately acquired. In addition, the flow of a crowd cannot be calculated in the technique of Patent Document 3. Thus, while the attributes of a person present in a location where an advertisement is provided can be determined, it is impossible to estimate what kind of people are present in other locations.

The invention is conceived in view of the above problems. An object of the invention is to provide a technique for grasping the distribution of an attribute of objects in detail.

Solution to Problem

An information processing apparatus of the invention includes (1) a first analyzing unit that calculates a flow of a collection of objects in a capturing range of a fixed camera using a first surveillance image, the first surveillance image being generated by the fixed camera, the fixed camera being a camera a position of which is fixed, (2) a second analyzing unit that calculates a distribution of an attribute of objects in a capturing range of a moving camera using a second surveillance image, the second surveillance image being generated by the moving camera, the moving camera being a camera a position of which is not fixed, and (3) an estimating unit that estimates the distribution of the attribute of the objects for an estimation range including a range not included in the capturing range of the moving camera based on the distribution of the attribute of the objects in the capturing range of the moving camera and the flow of the collection of objects in the capturing range of the fixed camera.

A control method of the invention is executed by a computer. The control method includes (1) a first analyzing step of calculating a flow of a collection of objects in a capturing range of a fixed camera using a first surveillance image, the first surveillance image being generated by the fixed camera, the fixed camera being a camera a position of which is fixed, (2) a second analyzing step of calculating a distribution of an attribute of objects in a capturing range of a moving camera using a second surveillance image, the second surveillance image being generated by the moving camera, the moving camera being a camera a position of which is not fixed, and (3) an estimating step of estimating the distribution of the attribute of the objects for an estimation range including a range not included in the capturing range of the moving camera based on the distribution of the attribute of the objects in the capturing range of the moving camera and the flow of the collection of objects in the capturing range of the fixed camera.

A program of the invention causes a computer to execute each step of the control method of the invention.

Advantageous Effects of Invention

According to the invention, a technique for grasping a distribution of an attribute of objects in detail is provided.

BRIEF DESCRIPTION OF THE DRAWINGS

The above object and other objects, features, and advantages will become more apparent from the following exemplary embodiments and the attached drawings.

DESCRIPTION OF EMBODIMENTS

Hereinafter, example embodiments of the invention will be described using the drawings. The same constituents will be designated by the same reference signs in all of the drawings, and descriptions of such constituents will not be repeated.

Example Embodiment 1

Figure 1:
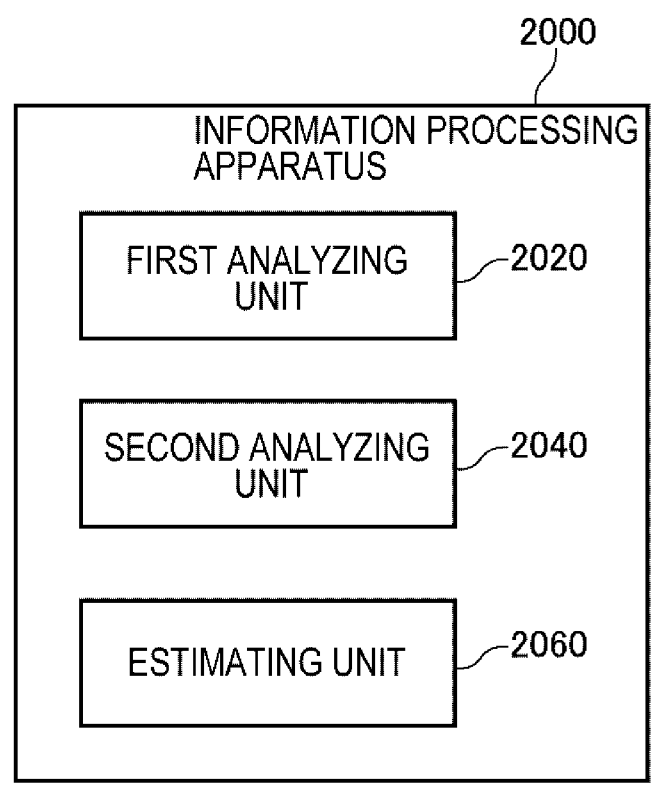
FIG. 1 is a block diagram illustrating an information processing apparatus according to Example Embodiment 1.

FIG. 1 is a block diagram illustrating an information processing apparatus 2000 according to Example Embodiment 1. In FIG. 1, each block represents a configuration of a function unit and not a configuration of a hardware unit.

The information processing apparatus 2000 uses two types of surveillance images including a surveillance image generated by a fixed camera and a surveillance image generated by a moving camera. The fixed camera is a camera the position of which is fixed. For example, the fixed camera is a surveillance camera that is fixedly installed at various locations such as a wall, a post, or a ceiling. Note that the location where the fixed camera is installed may be an indoor location or an outdoor location. The wall or the like to which the fixed camera is attached is enough to be fixed for a certain period, and it is not limited to an immovable thing. For example, the wall or the like where the fixed camera is installed may be a partition, a post, or the like that is temporarily installed in an event venue and the like. Alternatively, a moving object equipped with a camera that can be used as the moving camera, described later, may be caused to stop at a certain location, and the camera may be used as the fixed camera. The moving object is, for example, a vehicle, a motorcycle, a robot, or a flying object (for example, a drone and an airship).

The moving camera is a camera the position of which is moved. For example, the moving camera is attached to the body of a person or attached to the moving object and the like. The moving camera that is attached to the body of a person is, for example, a camera that is held by a hand (a video camera and a camera of a portable terminal such as a smartphone), or a camera that is fixed to a head, a chest, or the like (a body-worn camera and the like). The camera that is attached to a vehicle, a motorcycle, a robot, a flying object, or the like may be a camera that is attached to be used as a so-called drive recorder, or may be a camera that is separately attached for video surveillance.

Both of the moving camera and the fixed camera capture the location of a surveillance target as a video. The location of the surveillance target is not limited. For example, the location of the surveillance target is a path between an event venue and its closest station. Note that the location of the surveillance target may be an indoor location or an outdoor location.

Figure 2:
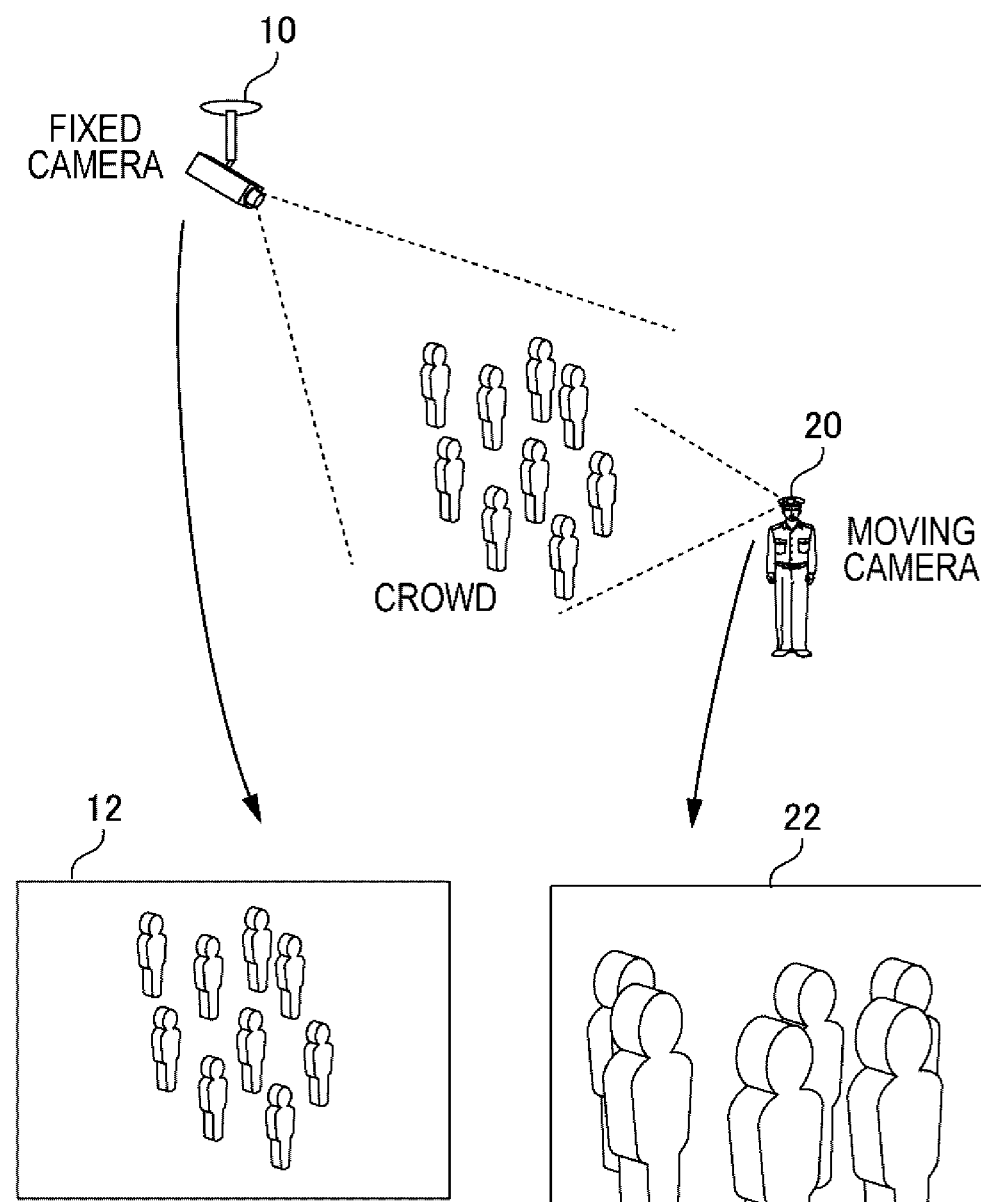
FIG. 2 is a diagram schematically illustrating the operation of a fixed camera and a moving camera.

FIG. 2 is a diagram schematically illustrating the operation of the fixed camera and the moving camera. A fixed camera 10 generates a first surveillance image 12 by capturing a collection of objects (crowd). Each object may be a person or a thing other than a person (for example, a vehicle, a motorcycle, and an animal). A moving camera 20 generates a second surveillance image 22 by capturing a crowd.

The capturing ranges of the fixed camera 10 and the moving camera 20 may overlap each other or may not overlap each other. The crowd captured by the fixed camera 10 and the crowd captured by the moving camera 20 may have a common part or may not have a common part.

The number of fixed cameras 10 may be one or more than one. The number of moving cameras 20 may be one or more than one. In addition, the number of fixed cameras 10 may be the same as or different from the number of moving cameras 20.

The information processing apparatus 2000 has a first analyzing unit 2020, a second analyzing unit 2040, and an estimating unit 2060. The first analyzing unit 2020 calculates the flow of the crowd in the capturing range of the fixed camera 10 using the first surveillance image 12.

The second analyzing unit 2040 calculates the distribution of an attribute of each object in the capturing range of the moving camera 20 using the second surveillance image 22. The attribute of each object is a feature of each object. For example, in a case where each object is a person, an age bracket is one example of the attribute.

The distribution of the attribute of the objects in a certain range represents "the degree to which objects having a certain attribute is included in the range". For example, assume that each object is a person, and the attribute is an age bracket. In this case, the attribute of the objects is, for example, "the ratio of children to adults included in the capturing range of the moving camera 20". Hereinafter, the distribution of the attribute of the objects will be referred to as an "attribute distribution".

The estimating unit 2060 estimates the attribute distribution for a range that is not included in the capturing range of the moving camera 20. Hereinafter, the range in which the estimating unit 2060 estimates the attribute distribution will be referred to as an estimation range. Note that it is sufficient for the estimation range to include a range that is not included in the capturing range of the moving camera 20, and may also include a range included in the capturing range of the moving camera 20.

Figure 3:
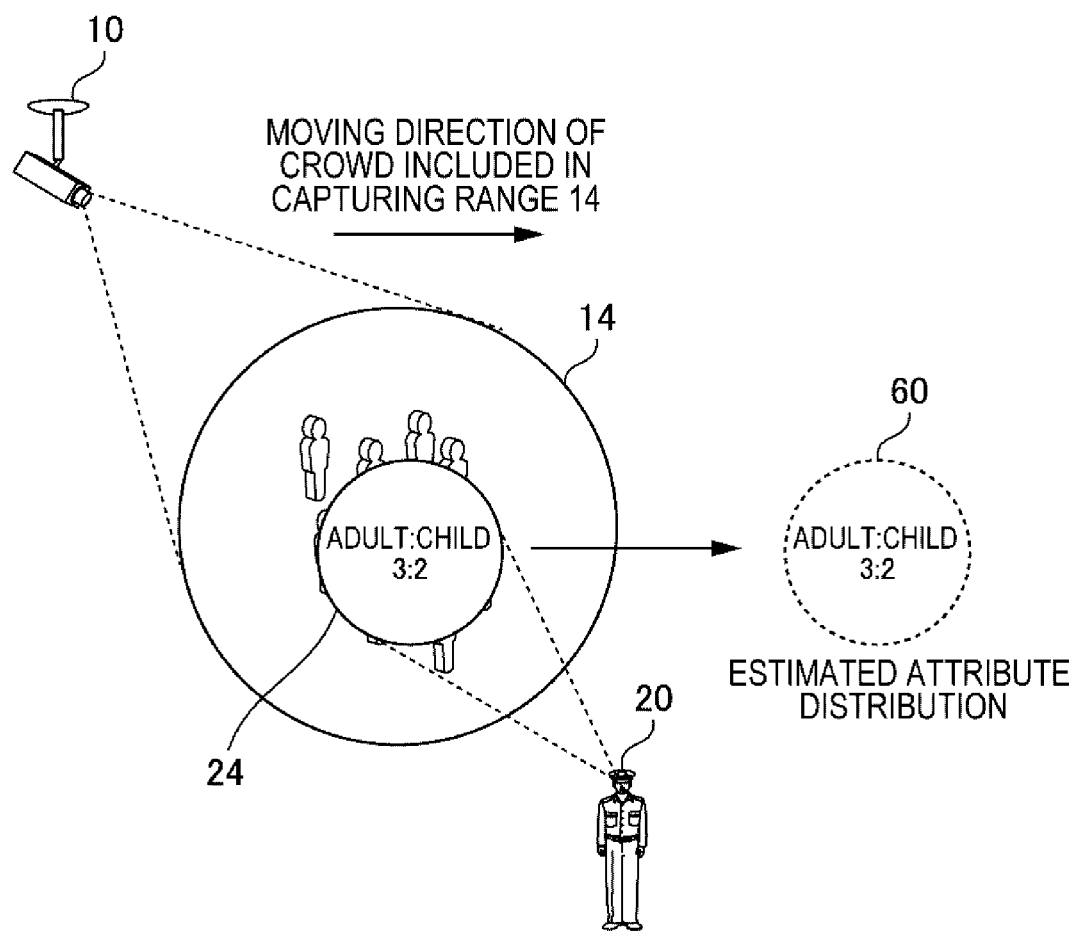
FIG. 3 is a diagram schematically illustrating estimation performed by an estimating unit.

FIG. 3 is a diagram schematically illustrating estimation performed by the estimating unit 2060. In FIG. 3, a crowd is included in both the capturing range of the fixed camera 10 and the capturing range of the moving camera 20. In addition, in FIG. 3, the capturing range of the fixed camera 10 is wider than the capturing range of the moving camera 20.

The first analyzing unit 2020 calculates the flow of the crowd using the first surveillance image 12 in which the crowd in a capturing range 14 of the fixed camera 10 is captured. Consequently, the first analyzing unit 2020 determines a fact that the crowd moves in the rightward direction.

The second analyzing unit 2040 calculates the attribute distribution in the crowd using the second surveillance image 22 in which the crowd in a capturing range 24 of the moving camera 20 is captured. Assume that the second analyzing unit 2040 calculates the attribute distribution as the "ratio of adults to children=3:2" for the capturing range 24.

From the fact that the crowd in the capturing range 14 of the fixed camera 10 is moving in the rightward direction, and that the attribute distribution in the capturing range 24 of the moving camera 20 is the "ratio of adults to children=3:2", the estimating unit 2060 predicts that the attribute distribution as the "ratio of adults to children=3:2" will move in the rightward direction. Therefore, the estimating unit 2060 estimates the attribute distribution to be the "ratio of adults to children=3:2" for an estimation range 60 that is on the right side from the capturing range 24 of the moving camera 20.

Note that the above example is an example for facilitating understanding of the operation of the information processing apparatus 2000 and is not intended to limit the operation of the information processing apparatus 2000. The operation of the information processing apparatus 2000 will be described in detail later.

Advantageous Effect

The information processing apparatus 2000 calculates the flow of the crowd using the first surveillance image 12 generated by the fixed camera 10. On the other hand, the information processing apparatus 2000 calculates the attribute distribution of the objects included in the crowd using the second surveillance image 22 generated by the moving camera 20. The information processing apparatus 2000 estimates the attribute distribution for a range not included in the capturing range of the moving camera 20 based on the flow of the crowd calculated using the first surveillance image 12 and the attribute distribution calculated using the second surveillance image 22. By doing so, the attribute distribution can be grasped for a wide range that cannot be covered by the moving camera 20. Consequently, the distribution of the attribute of the objects in a surveillance location can be grasped in detail.

Since the fixed camera 10 captures a large number of objects by capturing a wide range, the first surveillance image 12 is suitable for the purpose of calculating the flow of the whole crowd. In addition, since the angle of view of the fixed camera 10 is fixed, the position of the crowd can be accurately calculated using the first surveillance image 12. From this reason, the first surveillance image 12 is suitable for the purpose of calculating the flow of the whole crowd.

On the other hand, since the moving camera 20 that is worn by a security guard and the like can capture the objects at a short distance, each object is captured at a large size in the second surveillance image 22. Thus, the second surveillance image 22 is suitable for the purpose of calculating the feature (attribute) of the individual objects. In addition, since the position and direction of the moving camera 20 can be easily changed, the attribute of the objects can be recognized by flexibly changing the location and direction of capturing anytime using the moving camera 20.

The information processing apparatus 2000 can accurately estimate the distribution of the attribute of the objects by utilizing the feature of each of the fixed camera 10 and the moving camera 20 using the first surveillance image 12 and the second surveillance image 22.

Hereinafter, the present example embodiment will be described in further detail.

<Hardware Configuration Example of Information Processing Apparatus 2000>

Each functional configuration unit of the information processing apparatus 2000 may be implemented by hardware (for example, a hardwired electronic circuit) that implements each functional configuration unit, or may be implemented by a combination of hardware and software (for example, a combination of an electronic circuit and a program controlling the electronic circuit). Hereinafter, the implementation of each functional configuration unit of the information processing apparatus 2000 using a combination of hardware and software will be further described.

Figure 4:
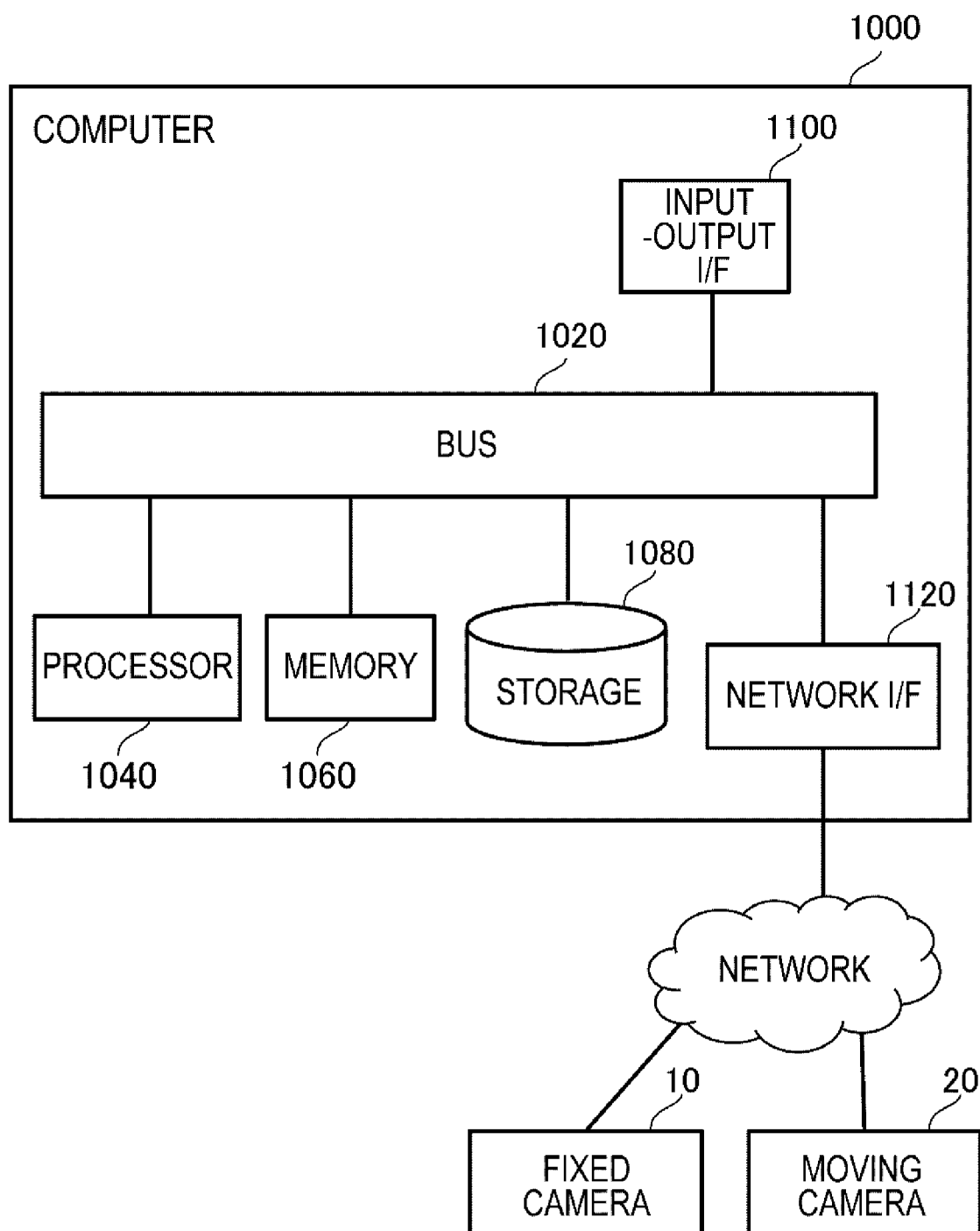
FIG. 4 is a diagram illustrating a computer for implementing the information processing apparatus.

FIG. 4 is a diagram illustrating a computer 1000 for implementing the information processing apparatus 2000. The computer 1000 is any computer. For example, the computer 1000 is a personal computer (PC), a server machine, a tablet terminal, or a smartphone. The computer 1000 may be a dedicated computer designed for implementing the information processing apparatus 2000, or a general-purpose computer.

The computer 1000 has a bus 1020, a processor 1040, a memory 1060, a storage 1080, an input-output interface 1100, and a network interface 1120. The bus 1020 is a data transfer path for transmitting and receiving data among the processor 1040, the memory 1060, the storage 1080, the input-output interface 1100, and the network interface 1120. However, the method of connecting the processor 1040 and the like to each other is not limited to bus connection. The processor 1040 is an operation processing device such as a central processing unit (CPU) or a graphics processing unit (GPU). The memory 1060 is a memory such as a random access memory (RAM) or a read-only memory (ROM). The storage 1080 is a storage device such as a hard disk, a solid state drive (SSD), or a memory card. The storage 1080 may also be a memory such as a RAM or a ROM.

The input-output interface 1100 is an interface for connecting the computer 1000 to input and output devices. For example, a keyboard or a mouse is connected to the input-output interface 1100.

The network interface 1120 is an interface for communicably connecting the computer 1000 to external apparatuses. The network interface 1120 may be a network interface for connection to a wired communication line, or a network interface for connection to a wireless communication line.

For example, the computer 1000 that implements the information processing apparatus 2000 is connected to the fixed camera 10 and the moving camera 20 through a network. However, the method of connecting the computer 1000 to the fixed camera 10 and the moving camera 20 is not limited to connection through a network. In addition, the computer 1000 may not be communicably connected to the fixed camera 10 and the moving camera 20.

The storage 1080 stores a program module that implements each functional configuration unit (the first analyzing unit 2020, the second analyzing unit 2040, and the estimating unit 2060) of the information processing apparatus 2000. The processor 1040 implements each function corresponding to the program module by reading each program module into the memory 1060 and executing the program module.

The hardware configuration of the computer 1000 is not limited to the configuration illustrated in FIG. 4. For example, each program module may be stored in the memory 1060. In this case, the computer 1000 may not include the storage 1080.

Note that the information processing apparatus 2000 may be implemented using a plurality of computers. For example, a computer that implements the function of the first analyzing unit 2020, a computer that implements the function of the second analyzing unit 2040, and a computer that implements the function of the estimating unit 2060 may be different computers.

All or a part of the functions of the information processing apparatus 2000 may be implemented by the fixed camera 10 or the moving camera 20. For example, a camera called an intelligent camera, a network camera, or an Internet protocol (IP) camera can be used as the fixed camera 10 or the moving camera 20 that has all or a part of the functions of the information processing apparatus 2000.

In the case of implementing a part of the function of the information processing apparatus 2000 by the fixed camera 10 or the moving camera 20, for example, the function of the first analyzing unit 2020 is implemented by the fixed camera 10. The function of the second analyzing unit 2040 is implemented by the moving camera 20. The function of the estimating unit 2060 is implemented by a server machine. In this case, the fixed camera 10 calculates the flow of the crowd in the capturing range of the fixed camera 10 by processing the first surveillance image 12 generated by itself. In addition, the moving camera 20 calculates the distribution of the attribute of the objects in the capturing range of the moving camera 20 by processing the second surveillance image 22 generated by itself. The server machine acquires information indicating the flow of the crowd in the capturing range of the fixed camera 10 from the fixed camera 10, and acquires information indicating the distribution of the attribute of the objects in the capturing range of the moving camera 20 from the moving camera 20. The server machine estimates the attribute distribution for a range not included in the capturing range of the moving camera 20 using the acquired information.

<Flow of Process>

Figure 5:
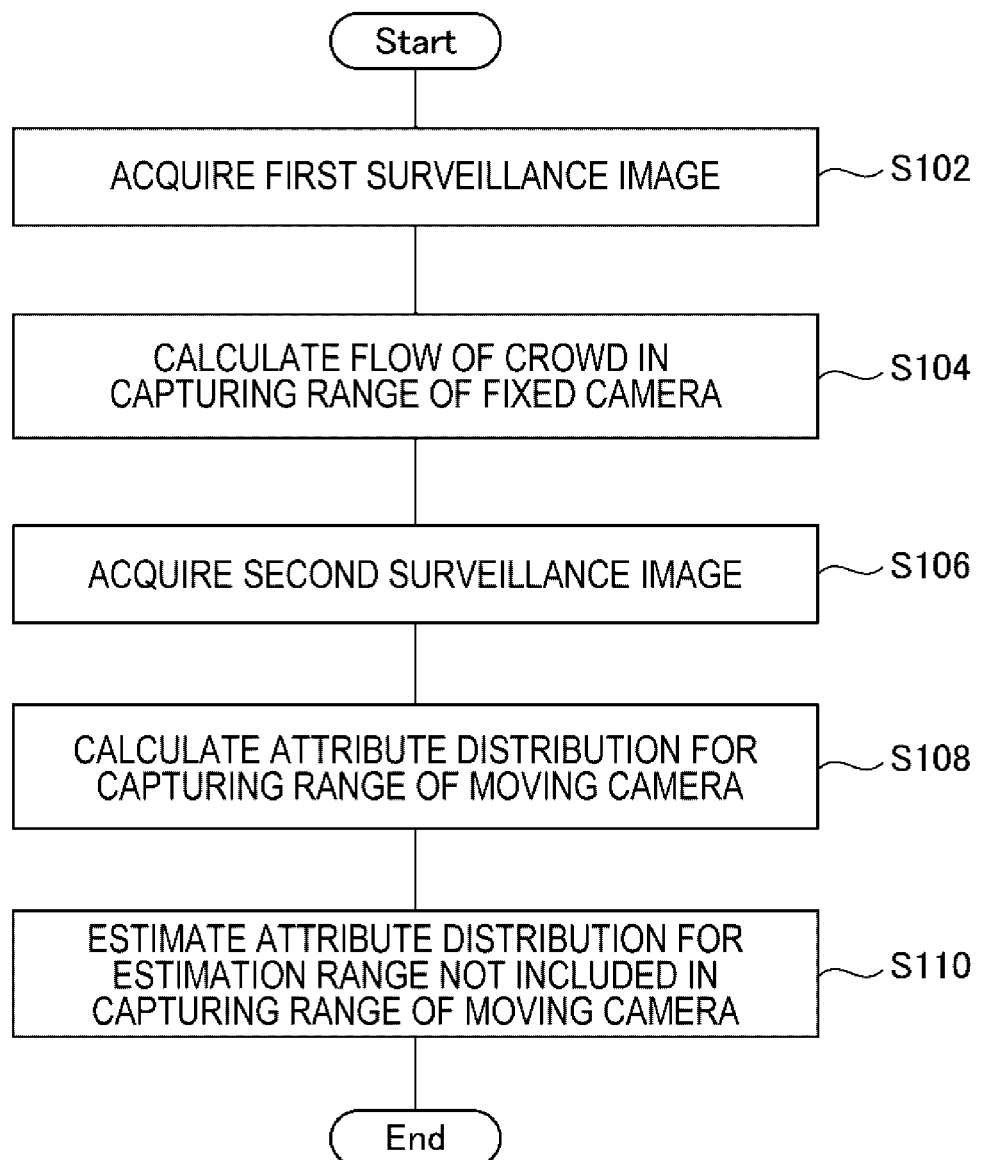
FIG. 5 is a flowchart illustrating the flow of a process executed by the information processing apparatus of Example Embodiment 1.

FIG. 5 is a flowchart illustrating the flow of a process executed by the information processing apparatus 2000 of Example Embodiment 1. The first analyzing unit 2020 acquires the first surveillance image 12 (S102). The first analyzing unit 2020 calculates the flow of the crowd in the capturing range of the fixed camera 10 using the first surveillance image 12 generated by the fixed camera 10 (S104). The second analyzing unit 2040 acquires the second surveillance image 22 (S106). The second analyzing unit 2040 calculates the attribute distribution for the capturing range of the moving camera 20 using the second surveillance image 22 generated by the moving camera 20 (S108). The estimating unit 2060 estimates the attribute distribution for the estimation range not included in the capturing range of the moving camera 20 based on the attribute distribution in the capturing range of the moving camera 20 and the flow of the crowd in the capturing range of the fixed camera 10 (S110).

<Method of Acquiring First Surveillance Image 12: S102>

The first analyzing unit 2020 acquires the first surveillance image 12 (S102). The method of acquiring the first surveillance image 12 by the first analyzing unit 2020 is not limited. For example, the first analyzing unit 2020 receives the first surveillance image 12 that is transmitted from the fixed camera 10. Alternatively, for example, the first analyzing unit 2020 accesses the fixed camera 10 and acquires the first surveillance image 12 that is stored in the fixed camera 10. The fixed camera 10 may store the first surveillance image 12 in a storage device that is installed outside the fixed camera 10. In this case, the first analyzing unit 2020 may access the storage device and acquire the first surveillance image 12.

The first analyzing unit 2020 may acquire the first surveillance image 12 in real time, or may acquire the first surveillance image 12 after a while from the generation of the first surveillance image 12. In the latter case, for example, the information processing apparatus 2000 grasps the past attribute distribution in the surveillance location by acquiring the first surveillance image 12 and the second surveillance image 22 captured in the past (for example, the previous day), and analyzes the behavior of the crowd.

In a case where the fixed camera 10 has the function of the first analyzing unit 2020, the first analyzing unit 2020 acquires the first surveillance image 12 that is stored in a storage device (for example, the memory 1060 or the storage 1080 in FIG. 4) inside the fixed camera 10.

<Method of Acquiring Second Surveillance Image 22: S106>

The second analyzing unit 2040 acquires the second surveillance image 22 (S106). The method of acquiring the second surveillance image 22 by the second analyzing unit 2040 is the same as the method of acquiring the first surveillance image 12 by the first analyzing unit 2020.

In a case where the moving camera 20 has the function of the second analyzing unit 2040, the second analyzing unit 2040 acquires the second surveillance image 22 that is stored in a storage device (for example, the memory 1060 or the storage 1080 in FIG. 4) inside the moving camera 20.

<Method of Calculating Flow of Crowd: S104>

The first analyzing unit 2020 calculates the flow of the crowd in the capturing range of the fixed camera 10 (S104). The first analyzing unit 2020 calculates at least the direction of the flow of the crowd. For example, the first analyzing unit 2020 calculates a vector (hereinafter, a flow vector) representing the flow of the crowd captured in the first surveillance image 12 using one or a plurality of the first surveillance images 12. The first analyzing unit 2020 sets the direction indicated by the vector as the direction of the flow of the crowd.

Furthermore, the first analyzing unit 2020 may calculate the speed of the flow of the crowd. In this case, the first analyzing unit 2020 calculates a velocity vector representing the velocity of the crowd as the flow vector. The first analyzing unit 2020 sets the direction indicated by the velocity vector as the direction of the flow of the crowd, and sets the length of the velocity vector as the speed of the flow of the crowd.

There are various methods of calculating the flow vector of the crowd by the first analyzing unit 2020. Hereinafter, those methods will be illustrated.

<<Method 1>>

Figure 6:
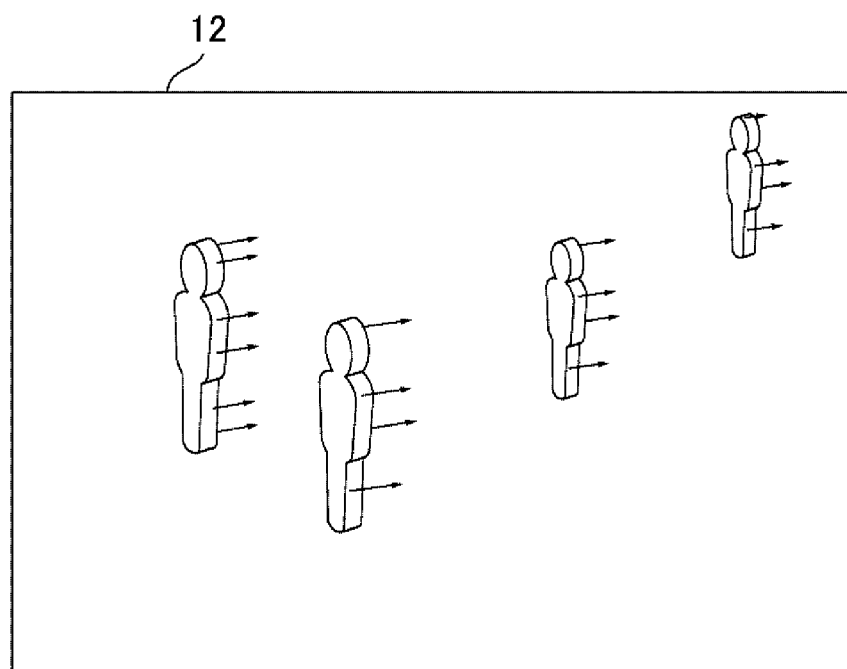
FIG. 6 is a diagram illustrating an optical flow calculated for a first surveillance image.

The first analyzing unit 2020 calculates the optical flow of a pixel or a feature point included in each of the plurality of first surveillance images 12 in time series. FIG. 6 is a diagram illustrating the optical flow calculated for the first surveillance image 12. Each arrow illustrated in FIG. 6 represents the optical flow calculated for the first surveillance image 12.

The first analyzing unit 2020 calculates the flow vector based on the calculated optical flow. For example, the first analyzing unit 2020 selects one of the calculated optical flows and calculates the flow vector based on the selected optical flow. For example, assume that the first analyzing unit 2020 randomly selects one optical flow, converts the vector on the image into a vector in a real space, and sets the vector in the real space as the flow vector. In this conversion, the flow vector is calculated by converting the coordinates of the point on the image into the coordinates of the point in the real space (on the map) using camera parameters described later. For example, given that the starting point and the ending point of the vector on the image are (xs, ys) and (xe, ye), and the coordinates in the real space corresponding to those points are (Xs, Ys) and (Xe, Ye), the flow vector can be calculated as (Xe−Xs, Ye−Ys).

Alternatively, for example, the first analyzing unit 2020 may calculate one vector by statistically processing the plurality of calculated optical flows, and calculate the flow vector based on this vector. This statistical processing is, for example, a process of calculating the average of the vectors. The calculation of the flow vector does not need to be performed once for the entire screen, and may be performed for individual regions.

Note that a well-known technique can be used as a technique for calculating the optical flow using the pixel or the feature point included in the image.

<<Method 2>>

Figure 7:
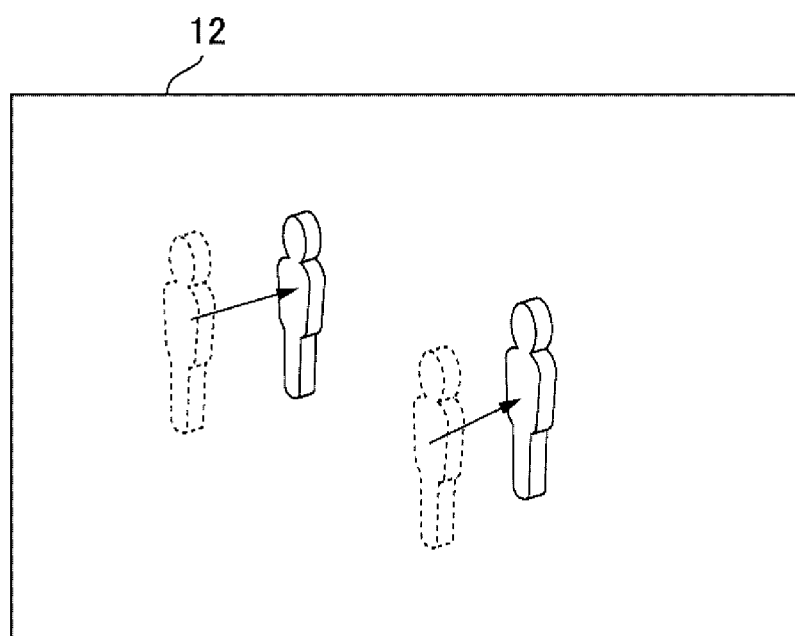
FIG. 7 is a diagram illustrating a change in the position of an object.

The first analyzing unit 2020 detects a captured object that is common in the plurality of first surveillance images 12 in time series, and calculates the flow vector based on a change in the position of the object. FIG. 7 is a diagram illustrating a change in the position of the object. In FIG. 7, assume that objects represented by a dotted line are captured in the t-th first surveillance image 12, and objects represented by a solid line are captured in the (t+1)-th first surveillance image 12. Each arrow represents a change in the position of each object. The change in the position of each object is, for example, a vector that connects the centroids or ground positions (in the case of a person, feet) of a plurality of regions representing the same object.

Note that in a case where a plurality of objects are captured in the first surveillance image 12, a plurality of vectors representing changes in the positions of the objects are calculated as in the case of using the optical flow. Therefore, for example, the first analyzing unit 2020 selects one of the plurality of objects, and sets the vector representing a change in the position of the selected object as the flow vector.

For example, the first analyzing unit 2020 randomly selects one object. Alternatively, for example, the first analyzing unit 2020 may select an easily traceable object from the objects captured in the first surveillance image 12. The easily traceable object is an object the feature of which, such as color and shape, is significantly different from other objects and the background. For example, assume that most people captured in the first surveillance image 12 wear almost white clothes, and the color of the background is similar to white. In this case, a person who wears red or black clothes is the easily traceable object. Therefore, the first analyzing unit 2020 calculates a vector representing a change in the position of the easily traceable object. This vector is set as the flow vector.

The vector that represents a change in position can be accurately calculated for the easily traceable object. Thus, by setting the vector calculated for the easily traceable object as the flow vector, the flow vector can be accurately calculated.

Alternatively, for example, the first analyzing unit 2020 may calculate one vector by statistically processing the plurality of vectors representing changes in the positions of the plurality of objects, and set this vector as the flow vector. This statistical processing is, for example, a process of calculating the average of the vectors. At this point, a weighted mean may be calculated by assigning a large weight to the vector calculated for the easily traceable object.

As described above, the vector that represents a change in position can be accurately calculated for the easily traceable object. Thus, by assigning a large weight to this vector, the flow vector can be accurately calculated.

<<Method 3>>

In a case where it is desirable to find the moving direction of the crowd, the first analyzing unit 2020 may calculate the direction of the flow vector based on the direction of each object captured in the first surveillance image 12. For example, in a case where each object is a person or an animal, the first analyzing unit 2020 determines the direction of the face or the body of each object, and sets the direction in which the front of the face or the body faces as the flow vector. In a case where each object is a thing such as a vehicle, a motorcycle, or a flying object, the first analyzing unit 2020 determines the traveling direction of each object from the shape, the position of various components (a bumper, a handle, and the like), and the like of the object captured in the first surveillance image 12, and sets the determined traveling direction as the direction of the flow vector.

The method of calculating the direction or speed of the flow of the crowd is not limited to the above methods. A well-known technique that uses one or more images to calculate the direction or the speed of the flow of the objects (for example, the flow of people (stream of people)) captured in the images can be used as the method of calculating the direction and the speed.

<Attribute of Object>

There are various attributes of an object handled by the information processing apparatus 2000. For example, in a case where the object is a person, the attribute is an age bracket, a sex, nationality, a group that the person belongs to, the presence of belongings, whether or not the person is a person having difficulty in walking, or the like. The person having difficulty in walking means a person who has a lower walking velocity than a general person due to a wound, a disability, and the like. The object may have various attribute values for each attribute. The attribute value is a value of the object for a certain attribute.

The attribute value of the age bracket has various values representing the age bracket. For example, the attribute value of the age bracket is an approximate age (10s or 20s) or a stage representing age (a child, a youth, a senior person, or the like). The attribute value of sex is male or female.

The attribute value of nationality is a value that represents the nation where the person was born, the nation where the person is living, or the feature of the person based on the nation of the person. For example, the attribute value of nationality indicates a Japanese person or a foreigner. In addition, for example, the attribute value of nationality indicates distinction of nations in Asia, Europe, America, or the like. In addition, for example, the attribute value of nationality may indicate a used language (Japanese, English, Chinese, or the like).

The attribute value of the group to which the person belongs may indicate any group. For example, in a case where the location under surveillance using the information processing apparatus 2000 is a passageway through which an audience passes, or a seat for the audience in a stadium, the person is categorized depending on a team for which the person is a supporter. More specifically, in a case where a team A and a team B are having a match in the stadium, the attribute value of the person may indicate a "supporter of the team A" or a "supporter of the team B".

The attribute value of the presence of belongings indicates, for various possessions, whether or not the person is carrying belongings, or whether or not the person is using belongings. For example, the possession corresponds to a cane, a wheelchair, a stroller, or the like. For example, the attribute value of the presence of a cane represents whether or not the person has a cane, or whether or not the person is using a cane.

The attribute value of whether or not the person is a person having difficulty in walking represents whether or not the walking velocity of the person is lower than a general velocity. For example, whether or not the person is a person having difficulty in walking can be determined by the presence of a cane, or the presence of a wheelchair. Specifically, it can be estimated that a person who is using a cane or a wheelchair is a person having difficulty in walking, and a person who is not using a cane or a wheelchair is not a person having difficulty in walking. Alternatively, for example, whether or not the person is a person having difficulty in walking can be determined by the age bracket. Specifically, it can be estimated that a senior person is a person having difficulty in walking, and a person other than a senior person is not a person having difficulty in walking. Alternatively, whether or not the person is a person having difficulty in walking may be determined by directly analyzing the way of walking of the person using a gait analysis technique. For example, whether or not the person is a person having difficulty in walking may be determined using categories including a way of walking using a cane, a way of walking of a blind person (a way of walking with a white cane, a way of walking with a guide dog, and the like), a way of walking of a deaf person with a hearing dog, and a general way of walking.

<Method of Calculating Attribute Distribution: S106>

The estimating unit 2060 calculates the attribute distribution in the capturing range of the moving camera 20 (S106). First, the estimating unit 2060 calculates the attribute value for all objects or a part of the objects captured in the second surveillance image 22. For example, in a case where sex is handled as an attribute, the second analyzing unit 2040 determines whether each object is a male or a female. The second analyzing unit 2040 calculates the attribute distribution based on the calculated attribute value of each object.

<<Method of Calculating Attribute Value>>

The method of calculating the attribute value of each object by the second analyzing unit 2040 varies depending on the handled attribute. For example, the second analyzing unit 2040 calculates the age bracket, the sex, or the nationality of a person from the feature and the like of the face of the person captured in the second surveillance image 22. A well-known technique can be used as a technique for calculating the age bracket, the sex, or the nationality (ethnic group) from the feature and the like of the face of the person.

In a case where the attribute is the group to which the person belongs, the second analyzing unit 2040 determines the group to which each object belongs based on the exterior, belongings, and the like of the object. For example, a team for which a certain person is a supporter can be determined based on the clothes, a cheering item, and the like possessed by the person captured in the second surveillance image 22. A well-known object recognition technique can be used as a technique for determining whether or not a specific thing is captured in the image. For example, a technique for determining whether or not the clothes of the person are the same as a uniform of a team that the person cheers for by analyzing the color and shape of the clothes, or a technique for determining whether or not the same object is included in the image by extracting a feature point and comparing the feature point with the feature point of a registered specific object can be applied.

In a case where the attribute is the presence of belongings, the second analyzing unit 2040 determines the attribute value of the person by calculating whether or not the person captured in the second surveillance image 22 possesses a cane, a wheelchair, a stroller, and the like. As described above, a well-known object recognition technique can be used as a technique for determining whether or not a specific thing is captured in the image. For example, objects such as a wheelchair, a cane, and a stroller may be detected using a discriminator that learns the features of a wheelchair, a cane, and a stroller in advance.

Similarly, in a case where the attribute is whether or not the person is a person having difficulty in walking, the second analyzing unit 2040 calculates the attribute value of the person by determining whether or not the person captured in the second surveillance image 22 possesses a cane or a wheelchair. Specifically, the second analyzing unit 2040 sets the attribute value of the person to "person having difficulty in walking" when the person captured in the second surveillance image 22 possesses a cane or a wheelchair. The second analyzing unit 2040 sets the attribute value of the person to "not a person having difficulty in walking" when the person does not possess a cane or a wheelchair. Alternatively, the second analyzing unit 2040 may determine the attribute value by determining whether or not the age bracket of the person captured in the second surveillance image 22 indicates a senior person. Specifically, the second analyzing unit 2040 sets the attribute value of the person to "person having difficulty in walking" when the age bracket of the person captured in the second surveillance image 22 indicates a senior person. The second analyzing unit 2040 sets the attribute value of the person to "not a person having difficulty in walking" when the age bracket of the person indicates other than a senior person. Alternatively, the second analyzing unit 2040 may calculate the attribute value by analyzing the way of walking of the person captured in the second surveillance image 22 and determining the degree of difference from the way of walking of a general person. Specifically, the second analyzing unit 2040 sets the attribute value of the person to "person having difficulty in walking" in a case where the degree of difference from the way of walking of a general person is significant. Otherwise, the second analyzing unit 2040 sets the attribute value of the person to "not a person having difficulty in walking". Alternatively, the second analyzing unit 2040 may decide the attribute value of the person by determining whether or not the way of walking of the person is a way of walking that is specific to a case where the person possesses a wheelchair or a cane, directly using a discriminator that learns the way of walking (way of moving forward) in a case where the person possesses a wheelchair or a cane.

Note that the attribute value may be calculated without the second surveillance image 22. For example, in a case where a microphone is installed around the capturing range of the moving camera 20, the second analyzing unit 2040 may calculate the attribute value of each object in the capturing range of the moving camera 20 by analyzing a voice that is recorded using the microphone. For example, in a case where the moving camera 20 generates a video including a voice, the second analyzing unit 2040 can acquire a voice around the capturing range of the moving camera 20 by acquiring the voice included in the video.

For example, the second analyzing unit 2040 determines the attribute value of the age bracket or the sex from the tone and the like of the recorded voice. In addition, for example, the second analyzing unit 2040 determines the attribute value of nationality by determining the used language from the recorded voice.

In addition, for example, the second analyzing unit 2040 determines the attribute value of the group to which the person belongs, from words included in the recorded voice. For example, it is considered that a voice uttered by a supporter of a certain team includes many words such as the names of players of the team. Therefore, dictionary data including keywords for the supporter of the team, such as the names of players belonging to that team, is prepared for each team. The second analyzing unit 2040 determines the attribute value of the group to which the person belongs by matching the word included in the recorded voice against the dictionary data.

In a case where the used language varies depending on the group to which the person belongs, the second analyzing unit 2040 may determine the used language from the recorded voice and determine the group to which the person belongs using the used language. For example, in a sports match venue where a match between Japan and America is taking place, it can be estimated that a person who speaks Japanese is a supporter of the Japanese team, and a person who speaks English is a supporter of the American team.

Note that there may be different dialects and pronunciations in the same language depending on the nation. For example, American English, British English, New Zealand English, and the like have different dialects and pronunciations. In addition, for example, there may be different dialects and pronunciations in the language of the same nation. For example, in Japanese, dialects and pronunciations vary depending on the regions such as Tokyo, Kansai, and Tohoku. Therefore, the second analyzing unit 2040 may determine the attribute value of nationality or the group to which the person belongs by determining such a difference in dialect and pronunciation.

In addition, the second analyzing unit 2040 may calculate the number of speakers (the number of objects) from the recorded voice using a speaker identification technique and the like, and reflect the number of speakers in the distribution.

<<Method of Calculating Attribute Distribution>>

The second analyzing unit 2040 calculates the attribute distribution in the capturing range of the moving camera 20 based on the calculated attribute value of each object. There are various methods of calculating the attribute distribution by the second analyzing unit 2040. For example, the second analyzing unit 2040 sets the number of objects having each attribute value (a collection including a pair of an attribute value and the number of objects having the attribute value) as the attribute distribution.

For example, in the case of handling sex as the attribute, assume that the second analyzing unit 2040 calculates the attribute value as male for 10 persons captured in the second surveillance image 22, and calculates the attribute value as female for 15 persons captured in the second surveillance image 22. In this case, the attribute distribution of sex in the capturing range of the moving camera 20 is "10 males and 15 females".

Alternatively, the attribute distribution may indicate the number of objects for only a certain attribute value. For example, in a case where the second analyzing unit 2040 calculates the attribute value as male for 10 persons captured in the second surveillance image 22, the attribute distribution of objects the sex of which is male is "15" in the capturing range of the moving camera 20.

Alternatively, the second analyzing unit 2040 may calculate the attribute distribution of a certain attribute as the ratio of the attribute value (the ratio of the number of objects having each attribute value). For example, as in the above example, assume that 10 males and 15 females are captured in the second surveillance image 22. In this case, the second analyzing unit 2040 calculates the attribute distribution of sex as "male:female=2:3".

In a case where the attribute value is calculated for a part of objects captured in the second surveillance image 22, the second analyzing unit 2040 calculates the attribute distribution for the part of objects for which the attribute value is calculated, and based on that attribute distribution, calculates the attribute distribution in the capturing range of the moving camera 20. That is, regarding objects the attributes value of which is not calculated, the attribute value thereof is estimated.

In this case, first, for the objects for which the attribute value is calculated, the second analyzing unit 2040 calculates the attribute distribution that is represented by the ratio of objects having each attribute value. It is highly likely that the ratio of the attribute value in the whole capturing range of the moving camera 20 is close to the ratio of the attribute value that is calculated for the part of objects included in the capturing range of the moving camera 20. For example, in a case where the ratio of "male: female=2:3" is calculated for the part of objects included in the moving camera 20, it is highly likely that the attribute is distributed at the same ratio for the whole capturing range of the moving camera 20. Therefore, the second analyzing unit 2040 sets the ratio of the attribute value calculated for the part of objects included in the moving camera 20 as the attribute distribution in the whole capturing range of the moving camera 20.

The second analyzing unit 2040 may generate the attribute distribution using a single second surveillance image 22, or may generate the attribute distribution using a plurality of the second surveillance images 22. In the latter case, for example, the second analyzing unit 2040 calculates the attribute distribution for each second surveillance image 22. The second analyzing unit 2040 generates the conclusive attribute distribution by statistically processing the attribute distribution calculated for each second surveillance image 22.

For example, assume that the second analyzing unit 2040 generates the attribute distribution using two second surveillance images 22. In this case, assume that the attribute distribution is calculated as "10 males and 20 females" for the first of the second surveillance images 22, and the attribute distribution is calculated as "12 males and 24 females" for the second of the second surveillance images 22. In this case, the second analyzing unit 2040 generates the attribute distribution as "11 males and 22 females" or "male:female=1:2" using the two second surveillance images 22.

<Method of Estimating Attribute Distribution: S108>

The estimating unit 2060 estimates the attribute distribution for the estimation range that is a range outside the capturing range of the moving camera 20 (S108). To do so, the estimating unit 2060 uses the flow of the crowd in the capturing range of the fixed camera 10, and the attribute distribution in the capturing range of the moving camera 20. Hereinafter, a concrete method of estimating the attribute distribution by the estimating unit 2060 will be illustrated.

The estimating unit 2060 calculates the attribute distribution in the estimation range using the velocity (hereinafter, a moving velocity) of the flow of the crowd in the capturing range of the fixed camera 10. First, the estimating unit 2060 estimates the moving velocity of the crowd in the capturing range of the moving camera 20 based on the moving velocity of the crowd in the capturing range of the fixed camera 10. The estimating unit 2060 estimates the attribute distribution in the estimation range by moving the attribute distribution in the capturing range of the moving camera 20 at the estimated velocity.

<<Case Where Capturing Range of Fixed Camera 10 Overlaps Capturing Range of Moving Camera 20>>

In a case where the capturing range of the fixed camera 10 overlaps the capturing range of the moving camera 20, the estimating unit 2060 estimates the moving velocity of the crowd in the capturing range of the moving camera 20 to be the same velocity as the moving velocity of the crowd in the capturing range of the fixed camera 10. For example, in a case where the moving velocity of the crowd in the capturing range of the fixed camera 10 is "10 m/sec in the rightward direction", the moving velocity of the crowd in the capturing range of the moving camera 20 is estimated to be "10 m/sec in the rightward direction". Therefore, the estimating unit 2060 sets the estimation range to be a position that is moved by 10*n [m] in the rightward direction from the capturing range of the moving camera 20 n seconds (n is a positive real number) after time t, and estimates the attribute distribution in the estimation range to be the same attribute distribution as the attribute distribution in the capturing range of the moving camera 20 at time t.

FIGS. 8A and 8B and FIGS. 9A and 9B are diagrams illustrating a scene in which the attribute distribution in the estimation range is estimated by moving the attribute distribution in the capturing range of the moving camera 20. In this example, the information processing apparatus 2000 repeats the calculation of the velocity of the crowd in the capturing range 14 of the fixed camera 10, the calculation of the attribute distribution in the capturing range 24 of the moving camera 20, and the estimation of the attribute distribution in the estimation range, each for one second. In this case, the first analyzing unit 2020 or the second analyzing unit 2040 calculates the velocity of the crowd and the attribute distribution at a certain time using the first surveillance image 12 or the second surveillance image 22 that is generated in one second immediately before the time.

Figure 8A:
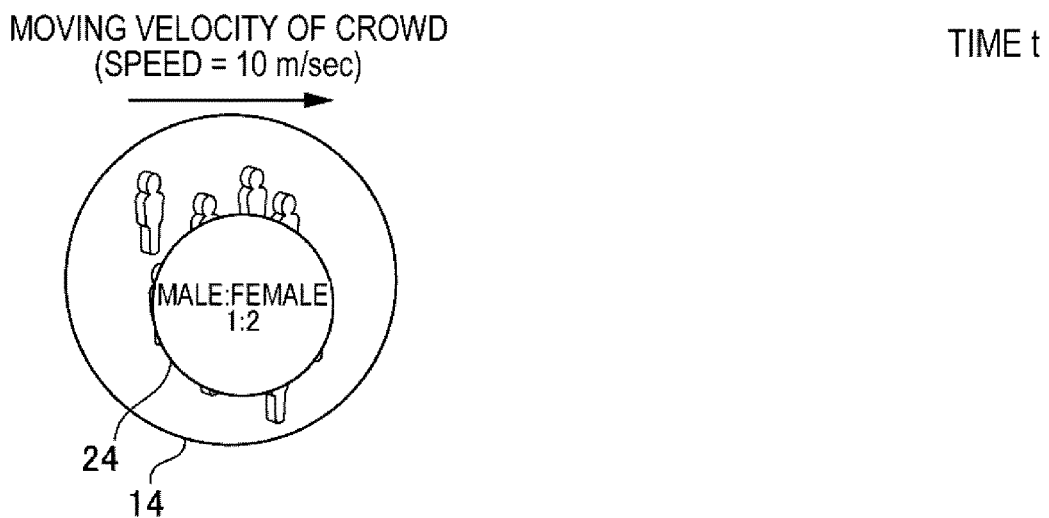
FIGS. 8A and 8B are diagrams illustrating a scene in which an attribute distribution in an estimation range is estimated by moving an attribute distribution in a capturing range of the moving camera.

At certain time t, the moving velocity of the crowd in the capturing range 14 of the fixed camera 10 is "10 m/sec in the rightward direction", and the attribute distribution in the capturing range 24 of the moving camera 20 is "male: female=1:2" (refer to FIG. 8A). Therefore, the estimating unit 2060 estimates the attribute distribution at time t+1 to be "male:female=1:2" for an estimation range 60-1 that is at a position moved by 10 m in the rightward direction from the capturing range 24 of the moving camera 20 (refer to FIG. 8B).

Figure 8B:
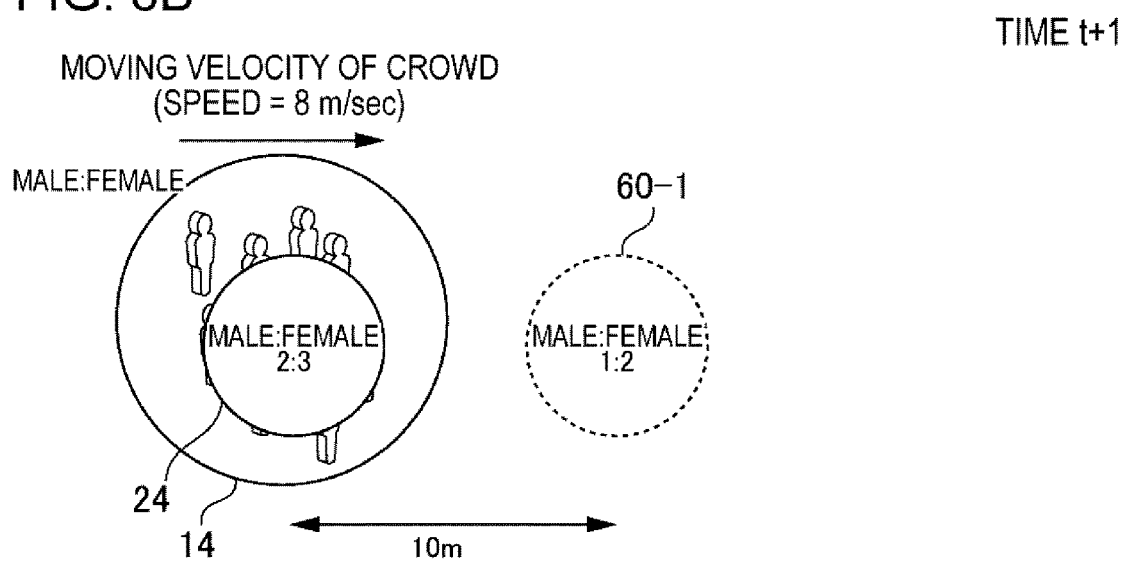

At time t+1, the moving velocity of the crowd in the capturing range 14 of the fixed camera 10 is "8 m/sec in the rightward direction", and the attribute distribution in the capturing range 24 of the moving camera 20 is "male: female=2:3" (see FIG. 8B). Therefore, the estimating unit 2060 estimates the attribute distribution at time t+2 to be "male:female=2:3" for an estimation range 60-2 that is at a position moved by 8 m in the rightward direction from the capturing range 24 of the moving camera 20 (see FIG. 9A). In addition, the estimation range 60-1 is further moved by 10 m in the rightward direction by time t+2.

Figure 9A:
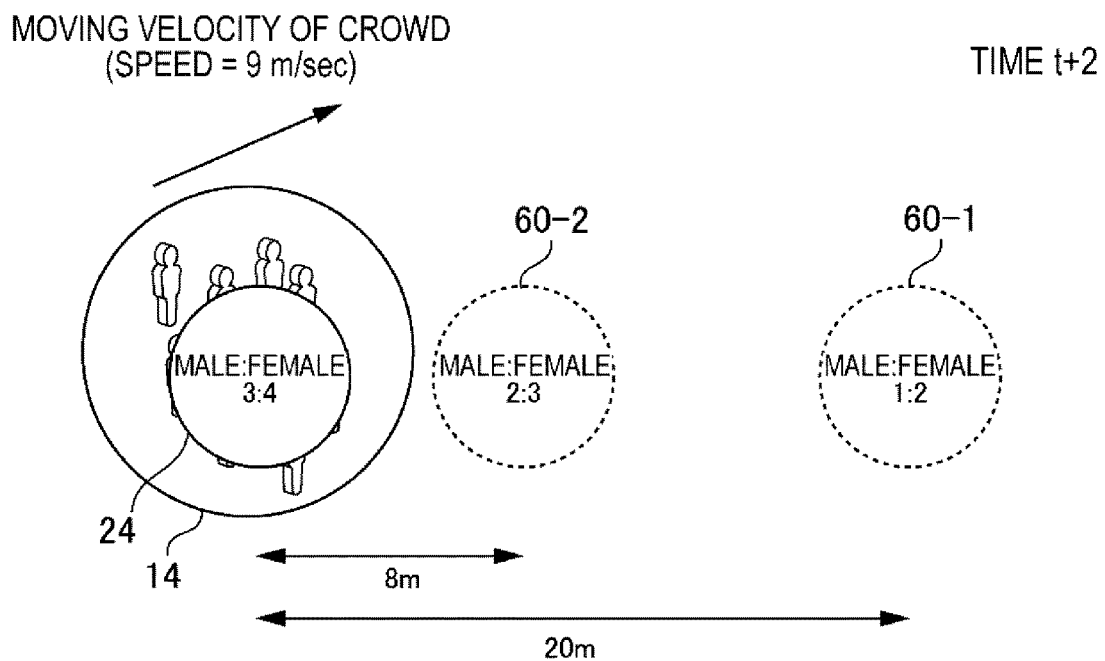
FIGS. 9A and 9B are diagrams illustrating a scene in which an attribute distribution in an estimation range is estimated by moving an attribute distribution in a capturing range of the moving camera.
Figure 9B:
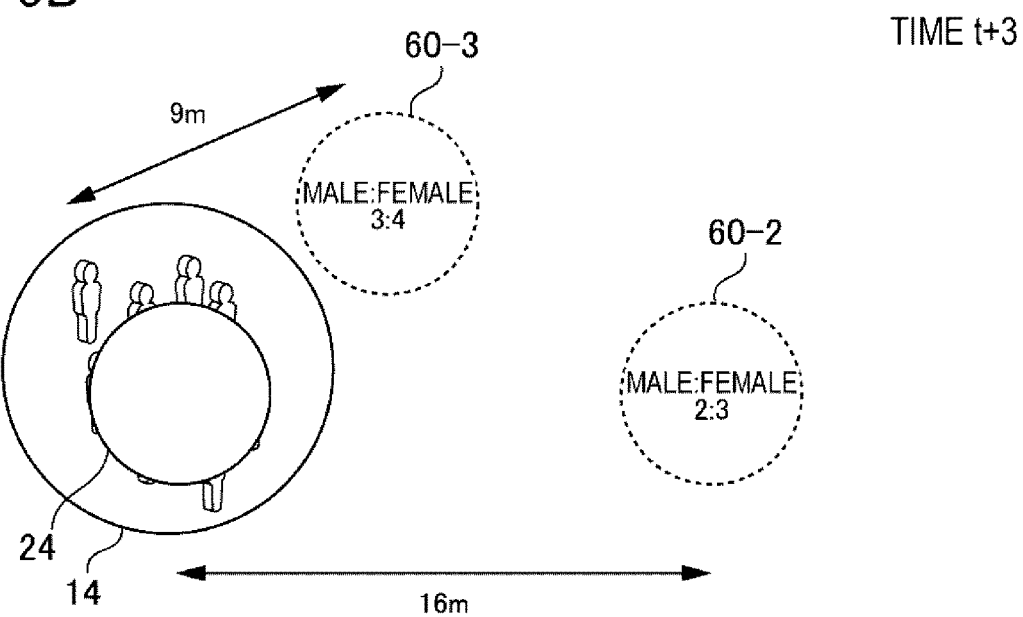

At time t+2, the velocity of the crowd in the capturing range 14 of the fixed camera 10 is "9 m/sec in an upper rightward direction", and the attribute distribution in the capturing range 24 of the moving camera 20 is "male: female=3:4" (see FIG. 9A). Therefore, the estimating unit 2060 estimates the attribute distribution at time t+3 to be "male:female=3:4" for an estimation range 60-3 that is at a position moved by 9 m in the upper rightward direction from the capturing range 24 of the moving camera 20 (see FIG. 9B). In addition, the estimation range 60-2 is further moved by 8 m in the rightward direction by time t+3. Note that while illustration is not provided in the drawings, the estimation range 60-1 is further moved by 10 m in the rightward direction by time t+3.

By such repeated processing of the information processing apparatus 2000, the attribute distribution can be estimated for a wide range that is not included in the capturing range of the moving camera 20.

<<Case Where Capturing Range of Fixed Camera 10 Does Not Overlap Capturing Range of Moving Camera 20>>

In a case where the capturing ranges of the fixed camera 10 and the moving camera 20 do not overlap each other, the estimating unit 2060 estimates the moving velocity of the crowd in the capturing range of the moving camera 20 from the moving velocity of the crowd in the fixed camera 10. Various specific methods may be used.

For example, the estimating unit 2060 estimates the moving velocity of the crowd in the capturing range of the moving camera 20 to be the same as the moving velocity of the crowd in the capturing range of the fixed camera 10. Particularly, for example, in a case where the capturing ranges of the fixed camera 10 and the moving camera 20 are positioned close to each other, or in a case where the flow of the crowd is uniform in the location of the surveillance target, it is highly likely that the moving velocity of the crowd in the capturing range of the fixed camera 10 is similar to that in the capturing range of the moving camera 20.

In addition, for example, the estimating unit 2060 estimates the moving velocity of the crowd in the capturing range of the moving camera 20 from the moving velocity of the crowd in the fixed camera 10 using map information around where the fixed camera 10 or the moving camera 20 is positioned. The map information is any information that represents a configuration of roads and the like. Generally, crowds move along roads. Thus, in a case where a road is curved, or in a case where a road has a corner, the moving direction of the crowd in the capturing range of the moving camera 20 may be different from the moving direction of the crowd in the capturing range of the fixed camera 10. Even in such a case, the moving direction of the crowd in the capturing range of the moving camera 20 can be estimated by recognizing the configuration of roads using the map information.

Figure 10A:
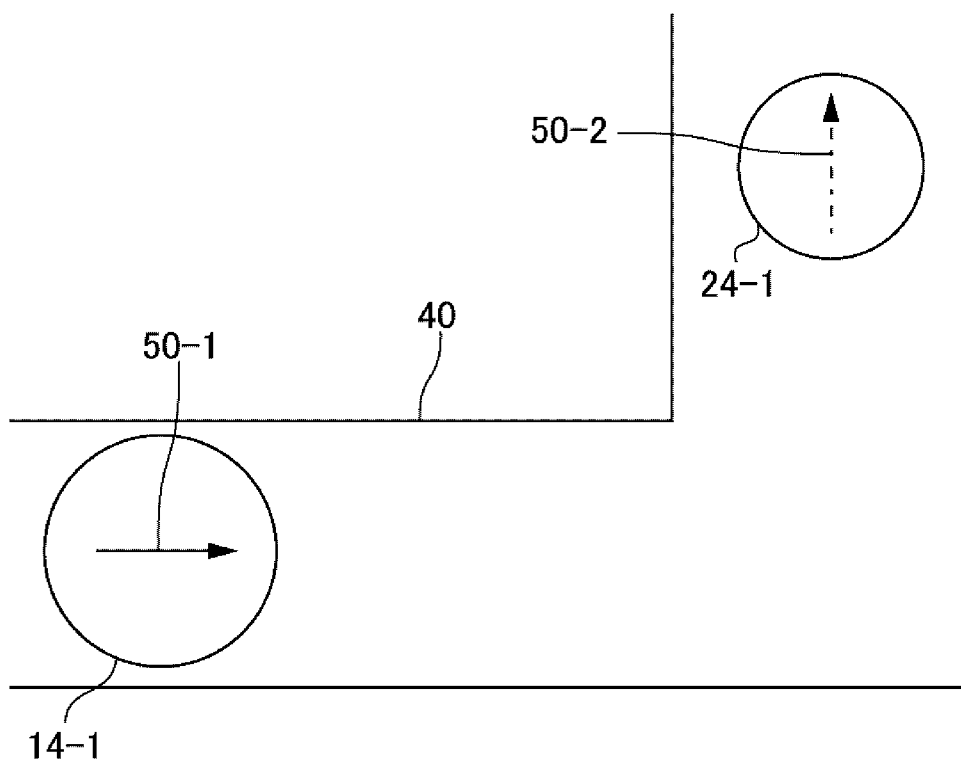
FIGS. 10A and 10B are diagrams illustrating a scene in which the movement direction of the moving camera is estimated using map information.
Figure 10B:
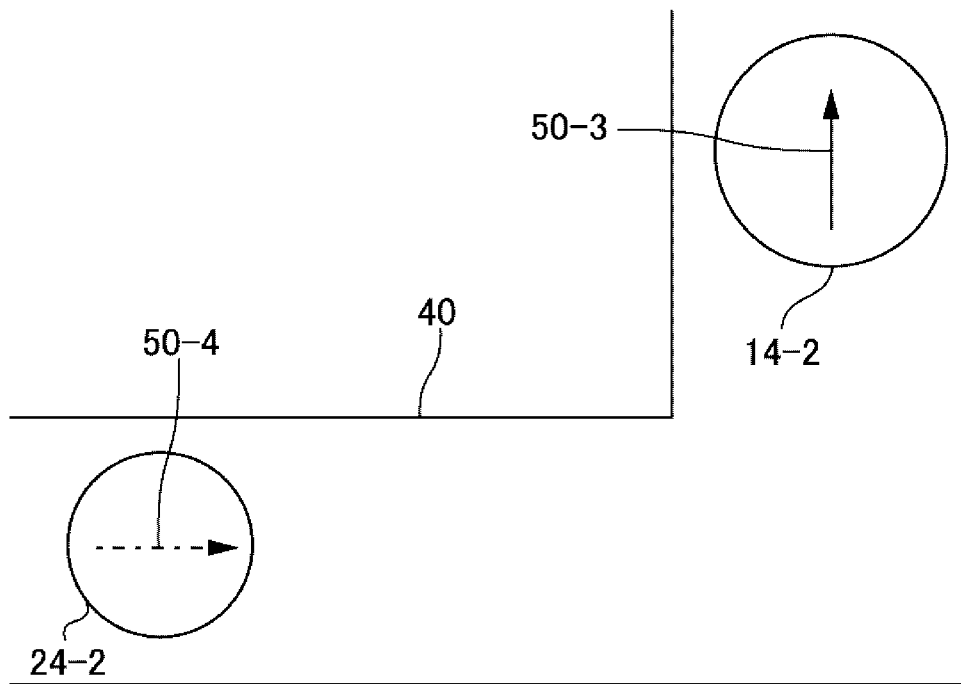

FIGS. 10A and 10B are diagrams illustrating a scene in which the moving direction of the moving camera 20 is estimated using the map information. In FIG. 10A, the moving direction of the crowd in a capturing range 14-1 of the fixed camera 10 is a direction 50-1. The estimating unit 2060 estimates the crowd included in the capturing range 14-1 to reach a capturing range 24-1 of the moving camera 20 along a road 40 using the map information. Therefore, the estimating unit 2060 estimates the moving direction of the crowd in the capturing range 24-1 of the moving camera 20 to be a direction 50-2 to which the direction 50-1 is moved along the road 40.

In FIG. 10B, the moving direction of the crowd in a capturing range 14-2 of the fixed camera 10 is a direction 50-3. The estimating unit 2060 estimates the crowd in the capturing range 14-2 of the fixed camera 10 to be the crowd in a capturing range 24-2 of the moving camera 20 that is moved along the road 40, using the map information. Therefore, the estimating unit 2060 estimates the moving direction of the crowd in the capturing range 24-2 of the moving camera 20 to be a direction 50-4 to which the direction 50-3 is moved along the road 40.

Note that in the case of using the map information, there are various methods of estimating the speed of the flow of the crowd in the capturing range of the moving camera 20. For example, the estimating unit 2060 estimates the speed of the flow of the crowd in the capturing range of the moving camera 20 to be the same as the speed of the flow of the crowd in the capturing range of the fixed camera 10.

Alternatively, for example, the estimating unit 2060 may estimate the speed of the flow of the crowd in the capturing range of the moving camera 20 based on a difference between the road around the capturing range of the fixed camera 10 and the road around the capturing range of the moving camera 20. For example, in a case where the width of the road around the capturing range of the moving camera 20 is larger than the width of the road around the capturing range of the fixed camera 10, the estimating unit 2060 estimates the speed of the flow of the crowd in the capturing range of the moving camera 20 to be lower than the speed of the flow of the crowd in the capturing range of the fixed camera 10. On the other hand, in a case where the width of the road around the capturing range of the moving camera 20 is smaller than the width of the road around the capturing range of the fixed camera 10, the estimating unit 2060 estimates the speed of the flow of the crowd in the capturing range of the moving camera 20 to be higher than the speed of the flow of the crowd in the capturing range of the fixed camera 10. However, when the density of the crowd becomes equal to a certain level or higher, the range of movement of a person is restricted, and the velocity of the crowd is decreased. Thus, considering the density of the crowd as well, the velocity of the crowd may be estimated to be decreased when the density of the crowd becomes equal to a certain level or higher.

A well-known technique can be used for generating the map information used by the estimating unit 2060. For example, the map information is map information that is used in a navigation application and the like. The method of acquiring the map information by the estimating unit 2060 is not limited. For example, the map information is stored in a storage that can be accessed from the estimating unit 2060.

Assume that the first analyzing unit 2020 calculates only the direction of the flow of the crowd and do not calculate the speed of the flow of the crowd. In this case, for example, the estimating unit 2060 handles a predetermined speed that is set in advance as the speed of the flow of the crowd in the capturing range of the fixed camera 10. The predetermined speed may be a value that is manually set, or may be a value that is calculated from a surveillance result in the past. Alternatively, the speed of the flow of the crowd that is estimated by simulating the movement of the crowd instead of the surveillance result may be used as the predetermined speed. That is, a change in the movement of the crowd is calculated by simulation using the map information. Various well-known crowd simulation technologies can be used.

In the case of repeatedly surveilling a certain location, the speed of the flow of the crowd passing through the location may be estimated from the surveillance result in the past. Therefore, for example, a statistic value of the speed of the flow of the crowd that is repeatedly calculated in the past for the capturing range of the fixed camera 10 is set as the predetermined speed. This calculation may be manually performed, or may be performed using any computer.

The speed of the flow of the crowd may vary depending on time periods. For example, the speed of the flow of the crowd may be high during a commute time period, and the speed of the flow of the crowd may be low during other time periods. Therefore, the predetermined speed may be set for each time period. In this case, the estimating unit 2060 uses the predetermined speed that is set for a time period matching a time period in which the first surveillance image 12 is generated.

Information that indicates the predetermined speed may be set in advance in the estimating unit 2060, stored in the storage device that can be accessed from the estimating unit 2060, or set by a user of the information processing apparatus 2000.

<<Estimation of Moving Velocity of Crowd>>

The method of estimating the moving velocity of the crowd included in the capturing range of the moving camera 20 is not limited to the above method of estimating the moving velocity of the crowd included in the capturing range of the fixed camera 10 to be the moving velocity included in the capturing range of the moving camera 20. For example, the estimating unit 2060 may directly calculate the moving velocity of the crowd included in the capturing range of the moving camera 20 using the second surveillance image 22. In this case, the estimating unit 2060 calculates the moving velocity of the crowd captured in the second surveillance image 22. Note that the method of calculating the moving velocity of the crowd captured in the second surveillance image 22 is the same as the method of calculating the moving velocity of the crowd captured in the first surveillance image 12.

However, since the moving camera 20 moves unlike the fixed camera 10, not only the objects but also the background move in the second surveillance image 22. Thus, in the case of calculating the moving velocity of the crowd captured in the second surveillance image 22, the motion of the crowd needs to be calculated after the motion of the background among a plurality of frames (second surveillance images 22) is compensated.

For example, the motion of the background can be acquired by matching feature points extracted from the background among the frames. Similarly, the motion of the foreground can also be acquired by matching feature points among the frames.

Therefore, first, the estimating unit 2060 acquires the amount of movement of each of the foreground and the background on the second surveillance image 22. Next, the estimating unit 2060 calculates the amount of movement of only the foreground (only the objects) by subtracting the amount of movement of the background from the amount of movement of the foreground. The estimating unit 2060 calculates the moving velocity from this amount of movement and its moving direction.

Alternatively, the estimating unit 2060 may calculate the moving velocity of the crowd included in the capturing range of the moving camera 20 using both the moving velocity of the crowd calculated using the first surveillance image 12 and the moving velocity of the crowd calculated using the second surveillance image 22. For example, the estimating unit 2060 sets the moving velocity of the crowd included in the capturing range of the moving camera 20 to be a velocity that is acquired by statistically processing (for example, averaging) the moving velocity of the crowd calculated using the first surveillance image 12 and the moving velocity of the crowd calculated using the second surveillance image 22. Note that at this point, a weighted mean may be calculated by assigning a large weight to the moving velocity of the crowd calculated using the second surveillance image 22.

<<Estimation Range 60>>

In the example in FIGS. 9A and 9B and FIGS. 10A and 10B, the estimation range 60 is a range that has the same shape and area as the capturing range of the moving camera 20. However, the estimation range 60 is not limited to such a range. Hereinafter, various estimation ranges 60 will be illustrated.

<<<Estimation Range 60 Having Predetermined Shape and Size>>>

The estimating unit 2060 sets the estimation range 60 to be a range that has a predetermined shape and area set in advance. The predetermined shape and area may be set in advance in the estimating unit 2060, stored in the storage device that can be accessed from the estimating unit 2060, or set by the user.

Figure 11A:
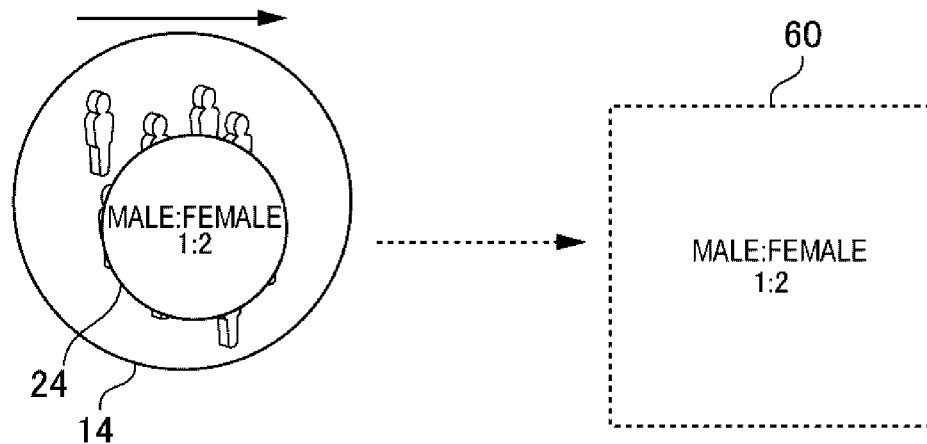
FIGS. 11A and 11B are diagrams illustrating a scene in which an attribute distribution is estimated for an estimation range having a predetermined shape and area.
Figure 11B:
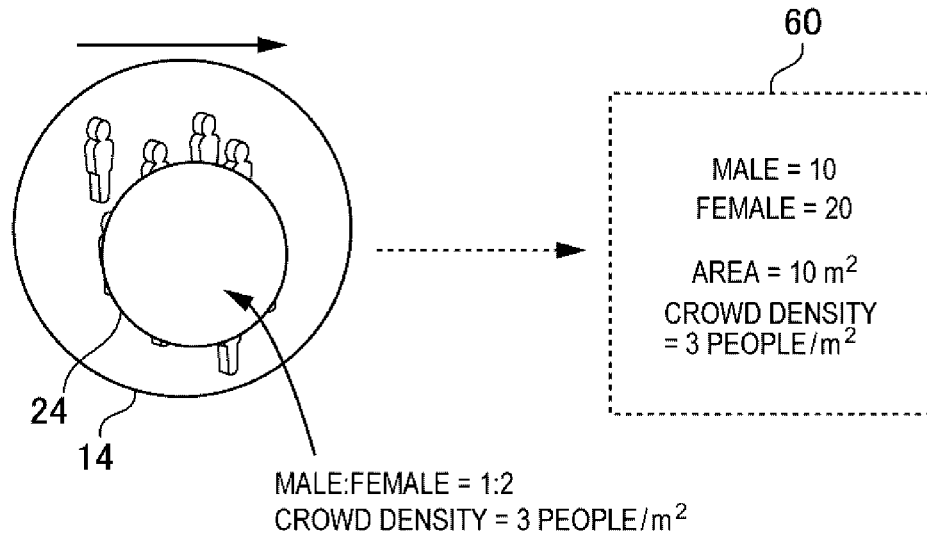

FIGS. 11A and 11B are diagrams illustrating a scene in which the attribute distribution is estimated for the estimation range 60 having the predetermined shape and area. Specifically, the estimation range 60 is a square range that has an area of 10 m². Note that the position of the estimation range 60 is calculated in the same manner as FIGS. 8A and 8B based on the moving velocity estimated for the crowd included in the capturing range of the moving camera 20.

The attribute distribution estimated in FIG. 11A represents the ratio of the attribute value (male:female=1:2). The estimating unit 2060 sets the attribute distribution in the estimation range 60 to be a distribution of "male:female=1:2" which is the same as the attribute distribution in the capturing range of the moving camera 20.

The attribute distribution estimated in FIG. 11B represents the number of objects having each attribute value. Since the area of the estimation range 60 is different from the area of the capturing range of the moving camera 20, it is considered that the number of objects included in the estimation range 60 is different from the number of objects included in the capturing range of the moving camera 20.

Therefore, first, the estimating unit 2060 calculates the number of objects included in the estimation range 60 based on crowd density in the capturing range of the moving camera 20.

The crowd density means the number of objects per unit area. The estimating unit 2060 estimates the crowd density in the estimation range 60 to be the same as the crowd density in the capturing range of the moving camera 20. Thus, the estimating unit 2060 calculates the number of objects included in the estimation range 60 by multiplying the crowd density in the estimation range 60 by the area of the estimation range 60.

For example, in FIG. 11B, the crowd density in the capturing range of the moving camera 20 is 3 people/m². Therefore, the estimating unit 2060 estimates the crowd density in the estimation range 60 to be 3 people/m². The estimating unit 2060 multiplies this crowd density and 10 m² which is the area of the estimation range 60. Consequently, a value of 30 is calculated as the number of objects included in the estimation range 60.

Furthermore, the estimating unit 2060 calculates the number of objects having each attribute value based on the number of objects included in the estimation range 60 and the ratio of the attribute value in the estimation range 60. The estimating unit 2060 estimates the ratio of the attribute value in the estimation range 60 to be the same as the ratio of the attribute value in the capturing range of the moving camera 20. Therefore, the estimating unit 2060 calculates the number of objects having each attribute value by multiplying the number of objects included in the estimation range 60 by the ratio of each attribute value.

For example, in FIG. 11B, the ratio of males to females included in the capturing range of the moving camera 20 is "male:female=1:2". Therefore, the estimating unit 2060 estimates the ratio of males to females included in the estimation range 60 to be "male:female=1:2". From this ratio and the fact that the number of objects included in the estimation range 60 is 30, the estimating unit 2060 sets the attribute distribution in the estimation range 60 to be "10 males and 20 females".

The crowd density in the capturing range of the moving camera 20 is calculated by the second analyzing unit 2040. The second analyzing unit 2040 calculates the crowd density based on the number of objects captured in the second surveillance image 22 and the area of the capturing range of the moving camera 20.

Note that in FIG. 11B, the estimating unit 2060 may use the crowd density in the capturing range of the fixed camera 10 instead of the crowd density in the capturing range of the moving camera 20. Since the fixed camera 10 which is a surveillance camera or the like generally captures the objects in a bird's-eye view, the crowd density in the capturing range of the fixed camera 10 is calculated with higher accuracy than the crowd density in the capturing range of the moving camera 20. Therefore, it is preferable that the estimating unit 2060 estimates the crowd density in the estimation range 60 to be the same as the crowd density in the capturing range of the fixed camera 10.

<<<Estimation Range 60 Having Same Shape and Area as Capturing Range of Fixed Camera 10>>>

Figure 12A:
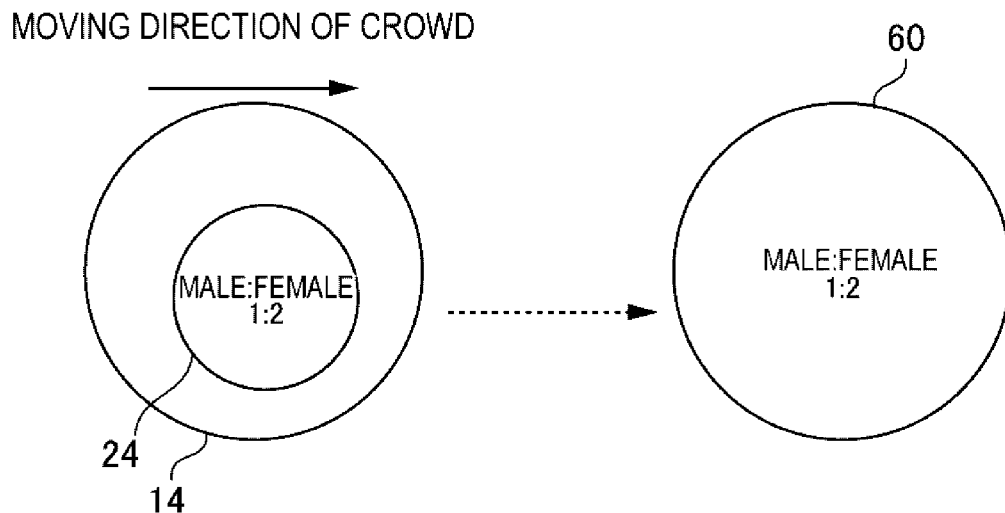
FIGS. 12A and 12B are diagrams illustrating a scene in which an attribute distribution is estimated for an estimation range having the same shape and area as a capturing range of the fixed camera.
Figure 12B:
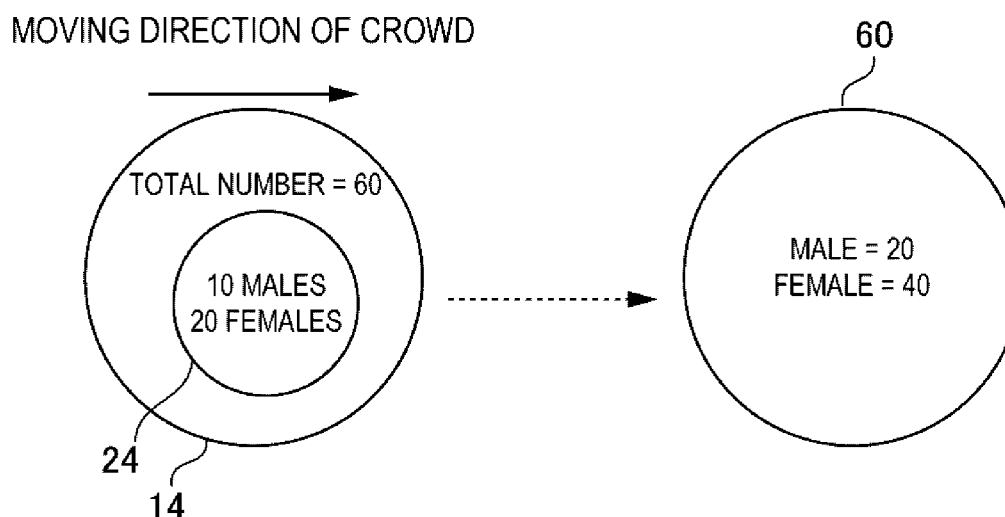

The estimating unit 2060 sets the estimation range 60 to be a range that has the same shape and area as the capturing range of the fixed camera 10. FIGS. 12A and 12B are diagrams illustrating a scene in which the attribute distribution is estimated for the estimation range 60 having the same shape and area as the capturing range of the fixed camera 10.

The attribute distribution estimated in FIG. 12A represents the ratio of the attribute value (male:female=1:2). The estimating unit 2060 sets the attribute distribution in the estimation range 60 to be a distribution of "male:female=1:2" which is the same as the attribute distribution in the capturing range of the moving camera 20.

The attribute distribution estimated in FIG. 12B represents the number of objects having each attribute value. The number of objects included in the crowd in the capturing range 14 of the fixed camera 10 is different from that in the crowd in the capturing range 24 of the moving camera 20.

In this case, the first analyzing unit 2020 calculates the total number of objects included in the capturing range 14. Assume that 60 people are included in the capturing range 14. Furthermore, the second analyzing unit 2040 calculates the attribute distribution for the crowd in the capturing range of the moving camera 20. Assume that the attribute distribution is calculated as "10 males and 20 females".

The estimating unit 2060 estimates the attribute distribution in the estimation range 60 using the ratio of the total number of objects included in the capturing range 14 to the total number of objects included in the capturing range 24, and the attribute distribution calculated for the capturing range 24. The total number of objects included in the capturing range 14 is twice the total number of objects included in the capturing range 24. Therefore, the estimating unit 2060 estimates the attribute distribution in the estimation range 60 to be "20 males (10×2) and 40 females (20×2)".

Note that the estimating unit 2060 may use the ratio of the crowd density in the capturing range 14 to the crowd density in the capturing range 24 instead of the ratio of the total number of objects included in the capturing range 14 to the total number of objects included in the capturing range 24. The reason is that those ratios have the same value.

<<<Estimation Range 60 Having Infinite Area>>>

The estimating unit 2060 sets the estimation range to be a range that has an infinite area. In this case, for example, the estimating unit 2060 estimates the attribute distribution in the estimation range by assuming the crowd to be spreading as time elapses, based on a distribution such as a Gaussian distribution.

Figure 13:
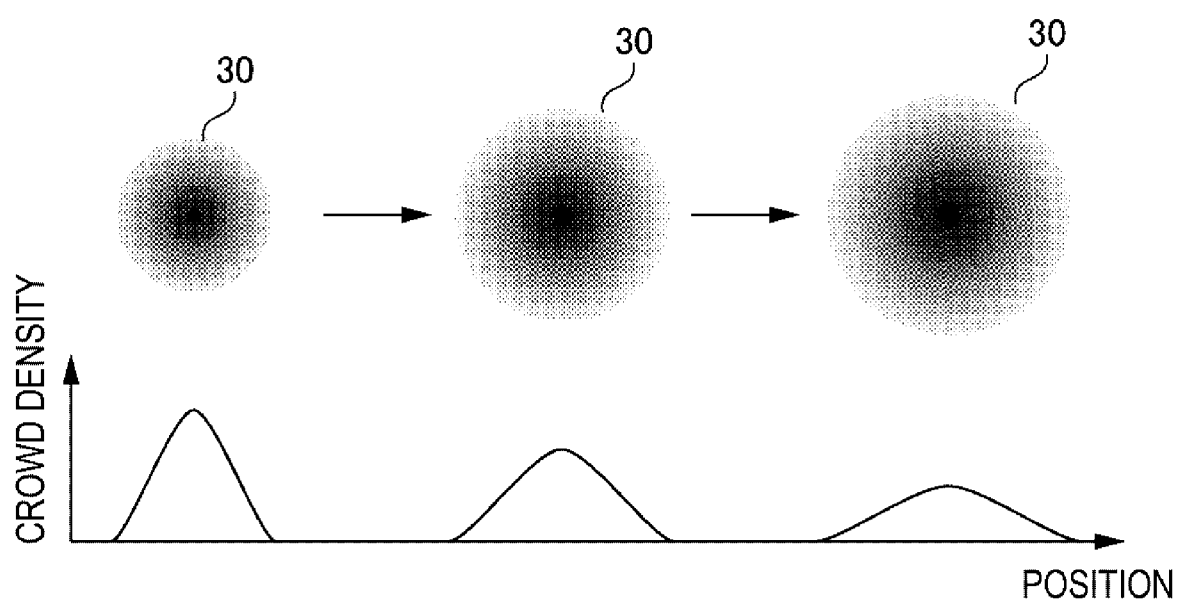
FIG. 13 is a diagram illustrating a scene in which a crowd disperses as time elapses.

FIG. 13 is a diagram illustrating a scene in which the crowd spreads as time elapses. In FIG. 13, a location in darker color represents higher crowd density. A crowd 30 is moving in the rightward direction. The crowd is spreading as the crowd moves in the rightward direction, that is, as time elapses. Note that a graph below the crowd 30 is a graph that represents a relationship between a position and crowd density. Note that while an isotropic distribution is illustrated, a non-isotropic distribution may also be used. For example, in a case where the crowd is walking along a narrow passageway, the distribution is likely to spread in the direction of the passageway and unlikely to spread in a direction perpendicular to the passageway. Thus, a distribution having a high degree of spread in the direction of the passageway may be used.

Hereinafter, a specific method of estimating the attribute distribution for a specified range having an infinite area will be illustrated.

The number of objects (hereinafter, objects a) that have a as an attribute value of an attribute A and are present at a position x at time t is represented by ha(x, t). Note that x is a vector and represents two-dimensional coordinates. Assume that ha(x, t) represents the number of objects that are centered at x and are in a range having the same area as the capturing range of the fixed camera 10.

The position of the crowd included in the capturing range of the moving camera 20 at time t0 is represented by x0(t0). Then, the number of objects that are included in the capturing range of the moving camera 20 at time t0 and have a as the attribute A can be represented by ha(x0(t0), t0).

Assume that at time t0, the second analyzing unit 2040 calculates the number of objects a to be La among L objects in the capturing range of the moving camera 20. In addition, assume that at time t0, the first analyzing unit 2020 calculates the number of objects included in the crowd at the position x0(t0) in the capturing range of the fixed camera 10 to be M. In this case, it can be estimated that Expression (1) is established. Assume that the capturing range of the moving camera 20 is in the capturing range of the fixed camera 10.

$$h_a(x_0(t_0), t_0) = L_a * \frac{M}{L} \quad (1)$$

The moving velocity of the crowd at the position x0 (t0) in the capturing range of the fixed camera 10 at time t0 is represented by v(x0(t0), t0). In addition, a time interval between each estimation of the attribute distribution by the estimating unit 2060 is represented by Δt. Then, a position xn(tn) of the crowd at time tn=t0+nΔt can be represented by Expression (2).

$$x_n(t_n) = x_{n-1}(t_{n-1}) + v(x_{n-1}(t_{n-1}), _{n-1}) \Delta t \quad (2)$$

Note that when the moving velocity of the crowd is assumed to be not changed, Expression (2) can be modified as follows.

$$x_n(t_n) = x_0(t_0) + v(x_0(t_0), t_0)(n-1)\Delta t \quad (3)$$

In this example, assume that the objects at the position x disperse in accordance with a function p(x, τ). A value representing time is substituted for τ. For example, a distribution the variance of which is increased in accordance with an increase in τ (along with elapse of time) as illustrated in FIG. 13 is used in the function p. For example, a Gaussian distribution is used as such a distribution.

When the function p is used, the number ha(xn, tn) of objects having a as the attribute A at the position xn at time tn=t+nΔt can be represented by Expression (4).

$$h_a(x_n, t_n) = h_a(x_0(t_0), t_0) p(x - x_n(t_n), n\Delta t) \quad (4)$$

The number of objects a at any position is found by inputting any value in x of Expression (3). Thus, according to Expression (3), the attribute distribution of the objects is theoretically estimated for the specified range having an infinite area.

Note that the attribute distribution (the number of objects having a as the attribute A) estimated by the information processing apparatus 2000 is not the attribute distribution based on the attribute value calculated by the second analyzing unit 2040 at time t0, but it is a superposition of the attribute distribution based on the attribute value calculated by the second analyzing unit 2040 at each time. Thus, the attribute distribution estimated by the information processing apparatus 2000 is represented by Expression (5). In Expression (5), the attribute distribution in an infinite range at time tn is estimated using the attribute distributions calculated at time t0 to tn.

$$H_a(x, t_n) = \sum_{k=0}^{n} h_a(x_0(t_k), t_k) p(x - x_{n-k}(t_n), (n-k)\Delta t) \quad (5)$$

Note that while all of ha from k=0 to n is added together in Expression (5), for each x, the value of k for which a value exists is limited in a case where p(x, τ) has a value only in a finite support. Thus, all of ha does not need to be added together, and ha may be added together for each position of x for only k for which the function p has a value. Alternatively, even in the case of a function the support of which is not finite like a Gaussian function, a sufficiently small value of the function may be regarded as zero, and ha may be added together in a region where the function has a value not equal to zero.

Assume that the attribute distribution that is represented by the number of objects having each attribute value ("15 males and 10 females" and the like) or by the ratio of the attribute value ("male:female=3:2" and the like) is desired to be calculated using Ha. This attribute distribution is a distribution that is acquired for a certain finite range. Therefore, in a case where such an attribute distribution is desired to be calculated, Ha(xi, tn) is calculated for each attribute value for a range of the position xi in which the distribution is desired to be grasped. For example, in a case where the attribute value of the attribute A is a or b, Ha(xi, tn) and Hb(xi, tn) are calculated. By using Ha(xi, tn) and Hb(xi, tn), an attribute distribution "N(a)=Ha(xi, tn), N(b)=Hb(xi, n)" that is represented by the number of objects having each attribute value, or an attribute distribution "a:b=Ha(xi, tn): Hb(xi, tn)" that is represented by the ratio of each attribute value can be calculated. Note that N(a) means the number of objects having a as the attribute value.

<Case Where Plurality of Flows of Crowds are Present in Fixed Camera 10>

Figure 14A:
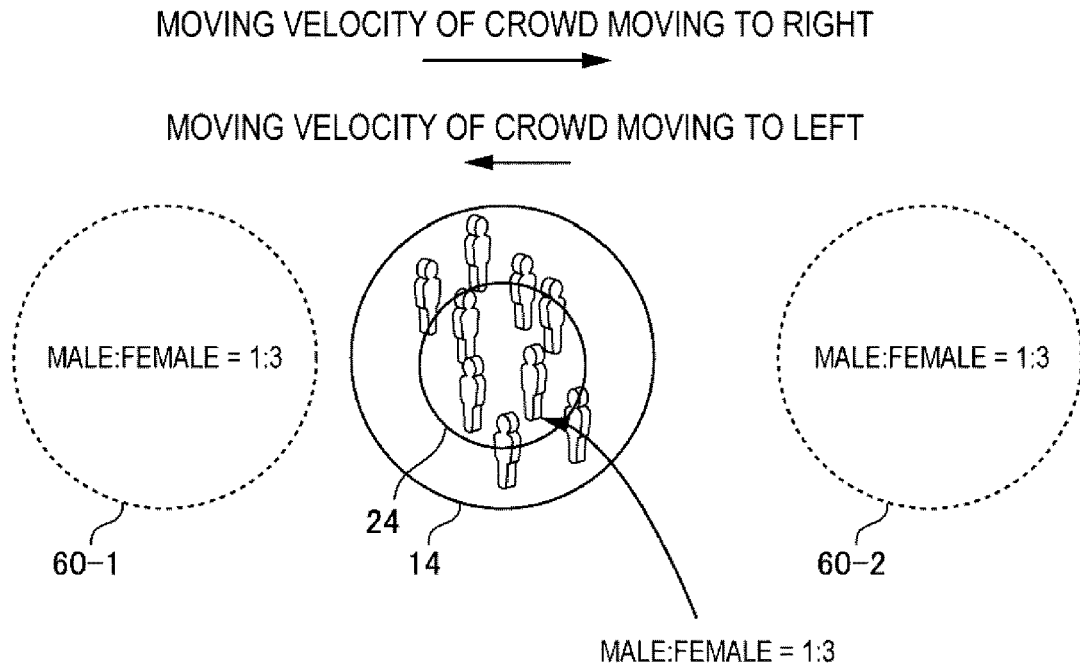
FIGS. 14A and 14B are diagrams illustrating a scene in which a plurality of flows of crowds are present.
Figure 14B:
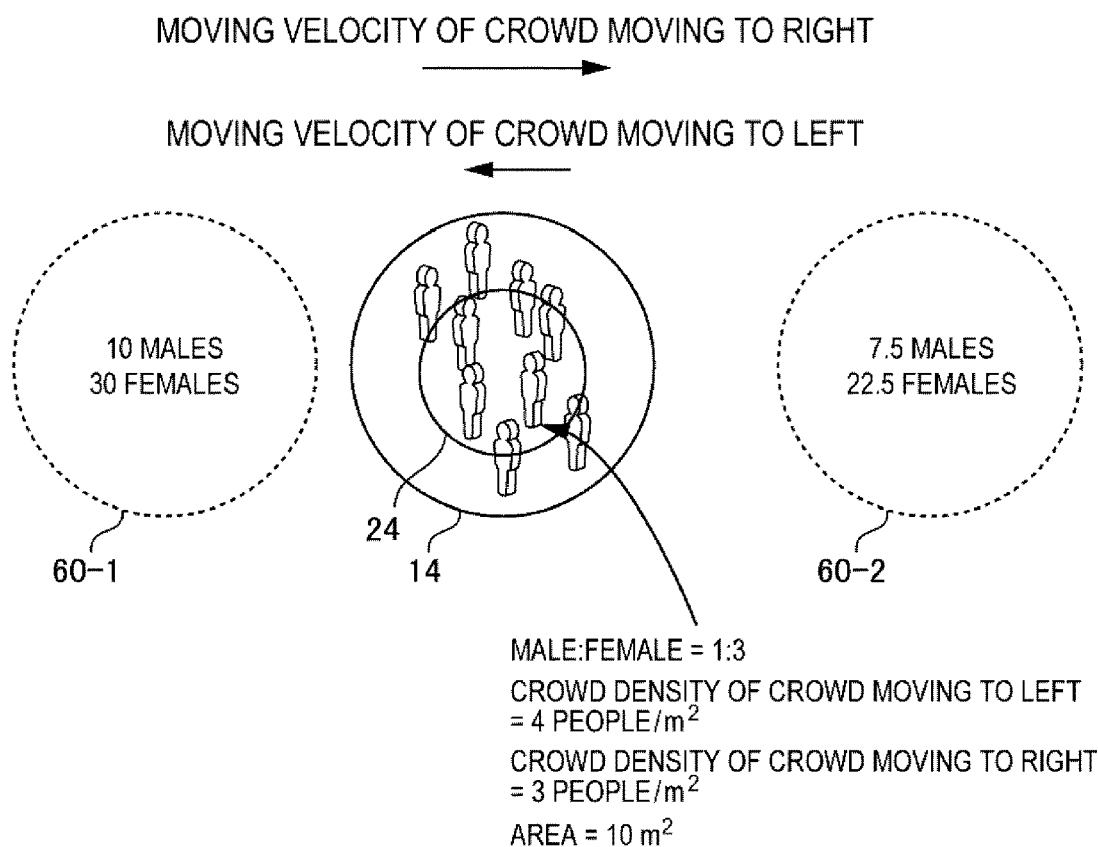

A plurality of flows of crowds may be present in the capturing range of the fixed camera 10. FIGS. 14A and 14B are diagrams illustrating a scene in which a plurality of flows of crowds are present. In FIGS. 14A and 14B, a crowd moving in the leftward direction and a crowd moving in the rightward direction are present in the capturing range of the fixed camera 10.

In a case where a plurality of flows are present, the estimating unit 2060 sets the estimation range for each crowd of a different flow and estimates the attribute distribution for each estimation range. For example, in FIGS. 14A and 14B, the estimating unit 2060 estimates the attribute distribution for two estimation ranges including the estimation range 60-1 positioned on the left side from the capturing range of the moving camera 20, and the estimation range 60-2 positioned on the right side from the capturing range of the moving camera 20.

In the case of setting the estimation range for each crowd having a different moving direction, the first analyzing unit 2020 calculates the moving velocity of each crowd having a different moving direction. For example, in FIGS. 14A and 14B, the first analyzing unit 2020 calculates the moving velocities of the crowd moving in the leftward direction and the crowd moving in the rightward direction. The first analyzing unit 2020 calculates the position of the estimation range 60-1 and the position of the estimation range 60-2 based on each calculated moving velocity.

In FIG. 14A, the attribute distribution that represents the ratio of the attribute value (male:female=1:3) is calculated for the estimation range 60. Therefore, the estimating unit 2060 estimates the attribute distribution in both of the estimation range 60-1 and the estimation range 60-2 to be "male:female=1:3" which is the same as the attribute distribution in the capturing range of the moving camera 20.

In FIG. 14B, the attribute distribution that represents the number of objects having each attribute value is calculated for the estimation range 60. In this case, the estimating unit 2060 estimates the total number of objects included in the estimation range 60-1 and the total number of objects included in the estimation range 60-2 based on the flow of each crowd in the capturing range of the fixed camera 10. For example, the estimating unit 2060 calculates the crowd density of the crowd moving in the leftward direction and the crowd density of the crowd moving in the rightward direction in the capturing range of the fixed camera 10. The estimating unit 2060 sets the total number of objects included in the estimation range 60-1 to be a value that is acquired by multiplying the crowd density of the crowd moving in the leftward direction in the capturing range of the fixed camera 10 and the area of the estimation range 60-1. Similarly, the estimating unit 2060 sets the total number of objects included in the estimation range 60-2 to be a value that is acquired by multiplying the crowd density of the crowd moving in the rightward direction in the capturing range of the fixed camera 10 and the area of the estimation range 60-2. Note that, for example, the estimating unit 2060 sets the area of the capturing range of the fixed camera 10 to be the area of the estimation range 60-1 and the estimation range 60-2.

In FIG. 14B, the crowd density of the crowd moving to the left is 4 people/m$^2$, and the crowd density of the crowd moving to the right is 3 people/m$^2$. The area of the estimation range 60 is 10 m$^2$ which is the same as the area of the capturing range 14. Thus, the estimating unit 2060 estimates the total number of objects included in the estimation range 60-1 to be 40, and the total number of objects included in the estimation range 60-2 to be 30.

Furthermore, the estimating unit 2060 estimates the ratio of the attribute value in the estimation range 60-1 and the estimation range 60-2 to be the same as the ratio of the attribute value in the capturing range of the moving camera 20. The estimating unit 2060 calculates the attribute distribution (the number of objects having each attribute value) in the estimation range 60-1 from the total number of objects included in the estimation range 60-1 and the ratio of the attribute value in the estimation range 60-1. Similarly, the estimating unit 2060 calculates the attribute distribution in the estimation range 60-2 from the total number of objects included in the estimation range 60-2 and the ratio of the attribute value in the estimation range 60-2.

In FIG. 14B, the ratio of males to females included in the crowd in the capturing range 24 is 1:3. Therefore, from this ratio and the total number of objects estimated for each estimation range 60, the estimating unit 2060 estimates the attribute distribution in the estimation range 60-1 to be "10 males and 10 females", and the attribute distribution in the estimation range 60-2 to be "7.5 males and 22.5 females". Note that while the attribute distribution in the capturing range of the moving camera is applied in the same manner for each direction, the attribute distribution may be individually calculated for each direction in a case where a crowd moving in each direction can be separated, and the attribute of each crowd can be individually estimated.

<Superposition of Plurality of Attribute Distributions>

Figure 15:
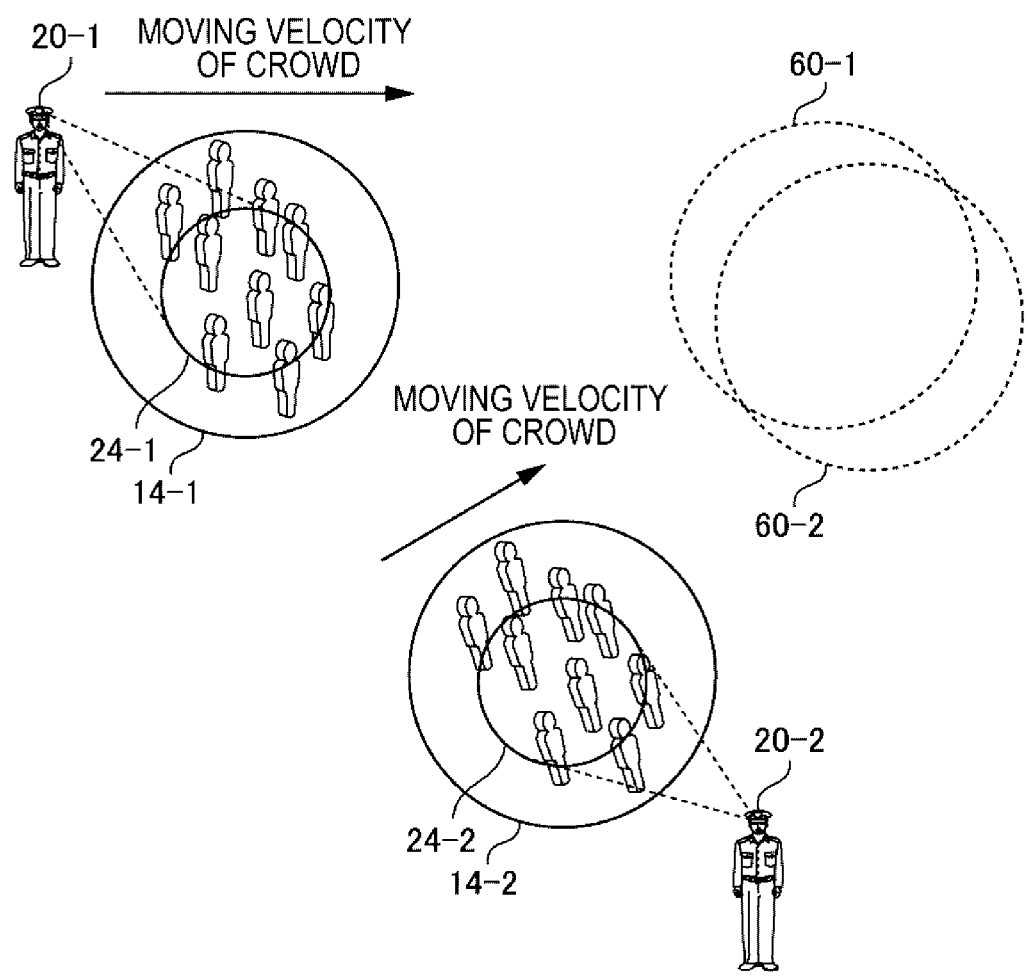
FIG. 15 is a diagram illustrating a scene in which a plurality of moving cameras are present.

Attribute distributions in a plurality of estimation ranges 60 that are estimated using different moving cameras 20 may overlap each other along with elapse of time. FIG. 15 is a diagram illustrating a scene in which a plurality of the moving cameras 20 are present. In FIG. 15, the estimation range 60-1 for which the attribute distribution is estimated based on the attribute distribution calculated for the capturing range 24 of a moving camera 20-1 overlaps the estimation range 60-2 for which the attribute distribution is estimated based on the attribute distribution calculated for the capturing range 24 of a moving camera 20-2.

In a case where a plurality of the estimation ranges 60 overlap each other at a certain position, the estimating unit 2060 estimates the attribute distribution at the position by superposing the attribute distribution in each estimation range 60 using a predetermined rule. For example, the estimating unit 2060 sets the attribute distribution at the position to be an attribute distribution that is calculated by statistically processing the attribute distributions in the plurality of estimation ranges 60.

At this point, the estimating unit 2060 may calculate the weighted mean of the attribute distributions in the plurality of estimation ranges 60 by attributing a weight to the attribute distribution in each estimation range 60 such that a larger weight is attributed to an attribute distribution having higher reliability. There are various methods of ranking the reliability of the attribute distribution in each estimation range 60. For example, the estimating unit 2060 sets higher reliability for the attribute distribution in the estimation range 60 having a shorter distance from the position of the moving camera 20 used for generating the attribute distribution. When the estimation range 60 is apart from the position of the moving camera 20 used for generating the attribute distribution, it is highly likely that the degree of difference between the actual motion of the crowd and the expected motion of the crowd is increased. For the same reason, the estimating unit 2060 may set higher reliability for the attribute distribution in the estimation range 60 for which a smaller amount of time elapses from the time of calculation of the attribute distribution.

Alternatively, the estimating unit 2060 may decide the reliability using information related to a path such as the map information. For example, in a case where a location in which the crowd is likely to stay is present halfway through, the velocity or the distribution of the crowd may be changed in the location. Therefore, the estimating unit 2060 may determine whether or not a location satisfying a predetermined condition (the likelihood of the crowd staying, and the like) is included on a path between the current location of the estimation range 60 and a location where the estimation range 60 is generated, and set the reliability of the attribute distribution in the estimation range 60 for which it is determined that such a location is included, to be lower than the reliability of the attribute distribution for which it is determined that such a location is not included. The predetermined condition may be set in advance in the estimating unit 2060, stored in the storage device that can be accessed from the estimating unit 2060, or set by the user.

Alternatively, instead of the map information, a similar determination may be performed using information on the likelihood of staying and the like that is measured in advance. Alternatively, instead of the measured information, information that is estimated by simulating the movement of the crowd may be used. Various well-known crowd simulation technologies can be used.

The second analyzing unit 2040 may use the attribute distribution estimated by the estimating unit 2060 to improve the accuracy of calculation of the attribute value of each object that is subsequently executed. Specifically, based on the estimated attribute distribution, the second analyzing unit 2040 recognizes that an object having a characteristic attribute value for a certain specific attribute (for example, a person having difficulty in walking) is present around the capturing range of a certain moving camera 20 or approaches the capturing range of the moving camera 20. The second analyzing unit 2040 detects the specific attribute in detail when calculating the attribute value for each object captured in the second surveillance image 22 generated by the moving camera 20.

For example, the second analyzing unit 2040 changes an algorithm for calculating the attribute value of the specific attribute to an algorithm that is more detailed than a generally used algorithm. For example, the second analyzing unit 2040 changes an algorithm of detecting a wheelchair from a relatively simple algorithm of detecting a wheelchair from the whole shape of each object to a detailed algorithm of detecting a wheelchair by examining small parts and the like.

When the algorithm of detecting a wheelchair from the whole shape of each object is used, the second analyzing unit 2040 may not be able to detect a wheelchair in a case where, for example, a part of the wheelchair captured in the second surveillance image 22 is covered by another person and not seen. On the other hand, when the algorithm of examining small parts is used, the second analyzing unit 2040 can detect the wheelchair at a high probability even if a part of the wheelchair is covered. Alternatively, the second analyzing unit 2040 may increase the detection rate by changing the algorithm of detecting the whole shape of each object to use a dictionary that is acquired by learning recognition for each direction.

<Method of Calculating Capturing Range>

Various processes described thus far use the capturing range of the fixed camera 10 and the capturing range of the moving camera 20. A method of calculating those capturing ranges will be described.

The capturing range of the fixed camera 10 can be calculated based on camera parameters of the fixed camera 10 at a time when the first surveillance image 12 is generated. The camera parameters are parameters that represent the position, the pose (the angle of rotation in the horizontal direction and the angle of rotation in the vertical direction), the magnitude of the angle of view (zoom ratio), and the like of a camera. The information processing apparatus 2000 calculates the capturing range (a space in the real world) of the fixed camera 10 using the map information and the value of each parameter. A well-known technique can be used for the method of calculating the capturing range of the camera using the map information, the position of the camera, the pose of the camera, and the angle of view of the camera. Note that since the position of the fixed camera 10 is fixed, a relationship between the capturing range of the fixed camera 10 and the camera parameters of the fixed camera 10 can be set in advance.

There are various methods of acquiring the camera parameters of the fixed camera 10 at the time when the first surveillance image 12 is generated. For example, the camera parameters are included in metadata of the first surveillance image 12. Alternatively, for example, the camera parameters of the fixed camera 10 can be acquired from a control device that controls the pose of the fixed camera 10. In this case, for example, the information processing apparatus 2000 acquires a pair of information indicating a time and the camera parameters of the fixed camera 10 at that time. Note that since the position of the fixed camera 10 is fixed, the camera parameter that represents the position of the fixed camera 10 can be recognized in advance.

The capturing range of the moving camera 20 can be calculated based on the map information and camera parameters of the moving camera 20 at a time when the second surveillance image 22 is generated. The value of a parameter representing the position of the moving camera 20 can be recognized using, for example, a global positioning system (GPS) sensor that is installed in the moving camera 20. The value of a parameter representing the inclination of the moving camera 20 in the vertical direction can be recognized using, for example, an acceleration sensor that is installed in the moving camera 20. The value of a parameter representing the inclination of the moving camera 20 in the horizontal direction can be recognized using, for example, an electronic compass that is installed in the moving camera 20. The value of a parameter representing the magnitude of the angle of view of the moving camera 20 can be acquired from, for example, a control device that controls the moving camera 20. For example, in a case where the moving camera 20 is a camera that is installed in a portable terminal, the parameter representing the angle of view of the moving camera 20 can be acquired from the portable terminal. Similarly, when the GPS sensor, the acceleration sensor, the electronic compass, and the like are installed in the portable terminal, the information processing apparatus 2000 can acquire the values of the parameter representing the position of the moving camera 20, the parameter representing the inclination of the moving camera 20 in the vertical direction, and the parameter representing the inclination of the moving camera 20 in the horizontal direction from the portable terminal. Note that the method of acquiring the value of each parameter is not limited to the above method.

The information processing apparatus 2000 calculates the capturing range (a space in the real world) of the moving camera 20 using the map information and the value of each parameter. A well-known technique can be used for the method of calculating the capturing range of the camera using the map information, the position of the camera, the pose of the camera, and the angle of view of the camera.

The method of acquiring the camera parameters of the moving camera 20 at the time when the second surveillance image 22 is generated is the same as the method of acquiring the camera parameters of the fixed camera 10 at the time when the first surveillance image 12 is generated.

<Association between Fixed Camera 10 and Moving Camera 20>

As described above, the estimating unit 2060 estimates the flow of the crowd in the capturing range of the moving camera 20 based on the flow of the crowd in the capturing range of the fixed camera 10. In a case where a plurality of the fixed cameras 10 are present, the estimating unit 2060 uses one or more fixed cameras 10 in order to estimate the flow of the crowd in the capturing range of a certain moving camera 20.

At this point, there are various methods of deciding which fixed camera 10 is to be used. For example, one or more fixed cameras 10 are associated in advance with the moving camera 20. In this case, in order to estimate the flow of the crowd in the capturing range of a certain moving camera 20, the estimating unit 2060 uses the fixed cameras 10 that are associated in advance with the moving camera 20. The association may be set in advance in the estimating unit 2060, stored in the storage device that can be accessed from the estimating unit 2060, or set by the user.

Alternatively, for example, in order to estimate the flow of the crowd in the capturing range of a certain moving camera 20, the estimating unit 2060 may use the fixed camera 10 that has a short distance from the moving camera 20. For example, the estimating unit 2060 estimates the flow of the crowd in the capturing range of the moving camera 20 using the fixed camera 10 that has the shortest distance from the moving camera 20.

Note that in the case of estimating the flow of the crowd in the capturing range of the moving camera 20 using the plurality of fixed cameras 10, the estimating unit 2060 estimates the flow of the crowd in the capturing range of the moving camera 20 based on the flow of the crowd in the capturing range of each fixed camera 10. The estimating unit 2060 estimates the flow of the crowd in the capturing range of the moving camera 20 by statistically processing the plurality of estimated flows. At this point, the estimating unit 2060 may calculate a weighted mean by assigning a larger weight to the flow that is estimated using the fixed camera 10 having a shorter distance from the moving camera 20. It is considered that the estimation accuracy is higher for the flow that is estimated using the fixed camera 10 having a shorter distance from the moving camera 20.

<Relationship between Data Used for Estimation and Estimation Timing>

Figure 16A:
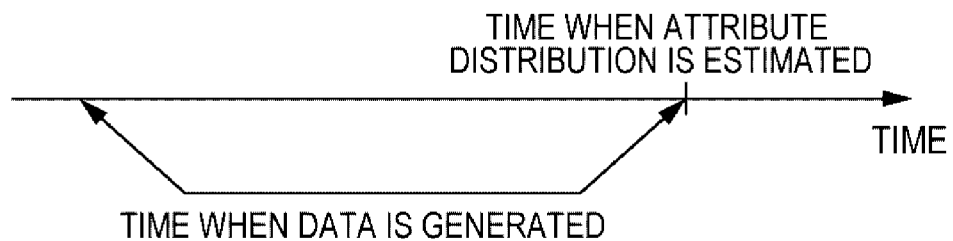
FIGS. 16A, 16B and 16C are diagrams illustrating a relationship between a time at which data is generated, and a time at which an attribute distribution is generated.
Figure 16B:
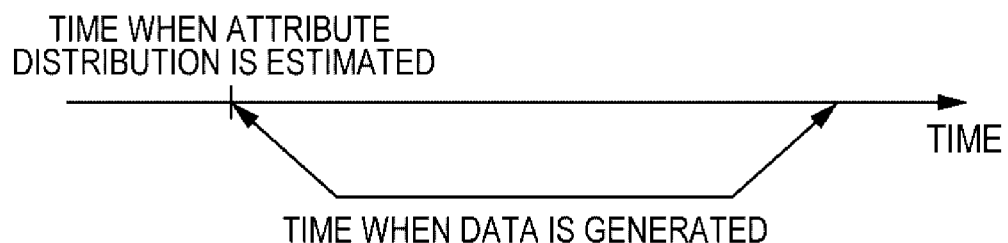
Figure 16C:
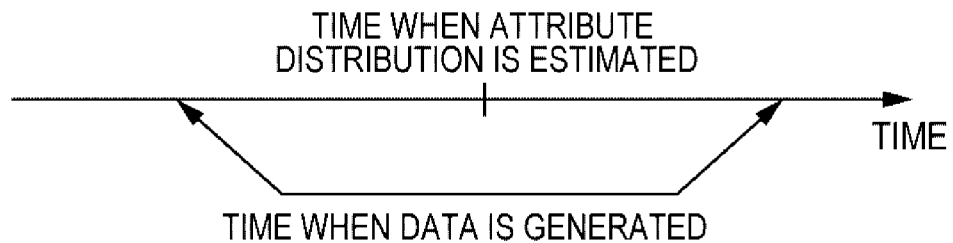

There are various relationships between a time when various types of data (the first surveillance image 12 and the second surveillance image 22) used for generating the attribute distribution by the information processing apparatus 2000 are generated, and for which time the attribute distribution is generated. FIGS. 16A, 16B and 16C are diagrams illustrating a relationship between the time when the data is generated, and the time when the attribute distribution is generated. In FIG. 16A, the estimating unit 2060 estimates the attribute distribution related to a certain time using data that is generated before the time. In FIG. 16B, the estimating unit 2060 estimates the attribute distribution related to a certain time using data that is generated after the time. In addition, in FIG. 16C, the estimating unit 2060 estimates the attribute distribution related to a certain time using both the data generated before the time and the data generated after the time.

A method of estimating the attribute distribution related to a certain time using the data generated after the time will be described. As described above, the information processing apparatus 2000 estimates the attribute distribution of objects in a range not included in the capturing range of the moving camera 20 by moving the attribute distribution of the objects in the capturing range of the moving camera 20 based on the flow of the crowd in the capturing range of the fixed camera 10. At this point, the attribute distribution for a time before the time when the first surveillance image 12 and the second surveillance image 22 are generated can be estimated by performing the process of "moving the attribute distribution of the objects in the capturing range of the moving camera 20" in a direction to the past.

Figure 17A:
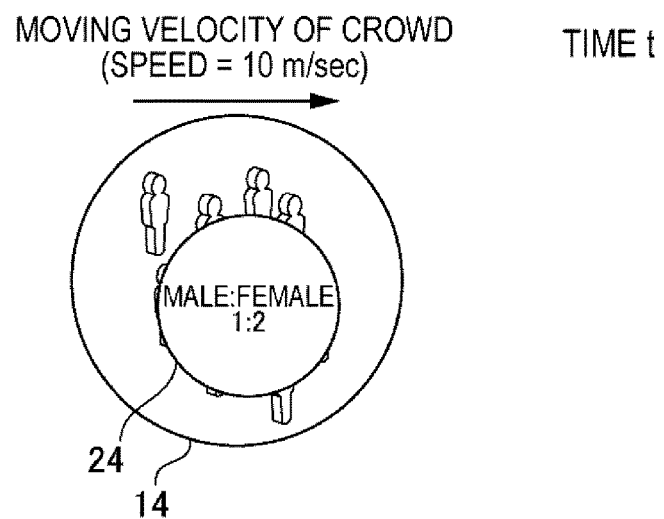
FIGS. 17A and 17B are diagrams illustrating a method of estimating an attribute distribution related to a certain time using data that is generated after the time.
Figure 17B:
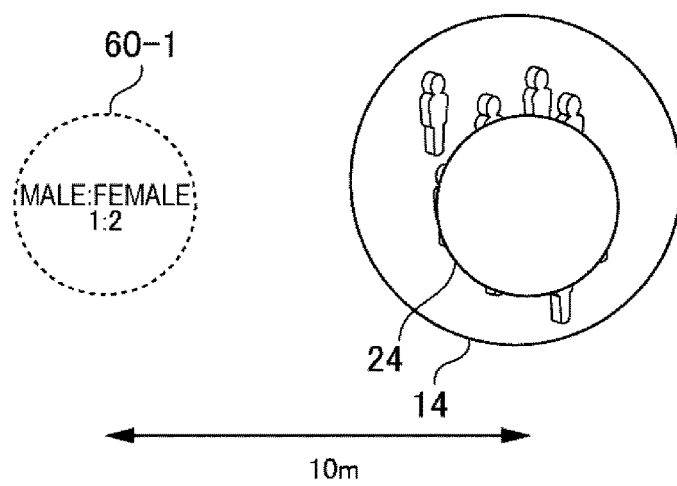

FIGS. 17A and 17B are diagrams illustrating the method of estimating the attribute distribution related to a certain time using the data generated after the time. In FIG. 17A, at time t, a crowd having an attribute distribution of "male: female=1:2" is moving in the rightward direction at a velocity of 10 m/s. Assume that the unit of time is seconds.

From the flow and the attribute distribution of the crowd, this crowd at time t−1 which is one second before time t is estimated to be positioned from its position at time t by 10 m in the leftward direction. Therefore, the estimating unit 2060 estimates the attribute distribution for the estimation range 60-1 at time t−1 as illustrated in FIGS. 17A and 17B.

Assume that the above method of estimating the attribute distribution of the estimation range using the distribution function p is used in the case of estimating the attribute distribution at a certain time using the data generated after the time. In this case, the position of the crowd at certain time t −n in the past is represented by Expression (6).

$$x_{-n}(t_{-n}) = x_{-n+1}(t_{-n+1}) - v(x_{-n+1}(t_{-n+1}), t_{-n+1})\Delta t \qquad (6)$$

The estimating unit 2060 acquires the distribution ha(x, t_−k) at time t_−k=t0−kΔt using Expression (6).

By estimating the attribute distribution related to a certain time using the data generated after the time, it is possible to estimate the attribute distribution of the objects at the time including the attribute distribution of the objects that cannot be grasped from the data generated before the time. For example, in a usage environment where a certain degree of delay is allowed in the estimation of the attribute distribution, a more detailed attribute distribution can be grasped using information in the future (data generated after a certain time) as illustrated in FIG. 16C.

<Method of Using Attribute Distribution>

The attribute distribution estimated by the information processing apparatus 2000 can be used in various forms. For example, it is achieved to appropriately support the crowd by grasping the attribute distribution in the location of the surveillance target.

For example, according to the information processing apparatus 2000, it is possible to grasp the distribution of the crowd that needs support in the location of the surveillance target. The crowd that needs support is exemplified by a crowd that includes a senior person, a child, a person having difficulty in walking, or the like. By grasping the distribution of such a crowd, it is possible to appropriately assign a security guard (including a so-called guide who performs only guiding) to a location where a large number of people need support.

Assume that the information processing apparatus 2000 is a terminal used at a surveillance center from which instructions are provided to security guards. In this case, an administrator at the surveillance center recognizes a location where a crowd that needs support is present. In a case where the number of security guards is insufficient in the location, the administrator can direct a security guard in a different location (for example, a location where a large number of people do not need support) to the location.

Assume that the information processing apparatus 2000 is a portable terminal that is used by each security guard on site. In this case, the security guards can grasp the distribution of the crowd needing support using their portable terminals. In a case where the number of security guards is insufficient in a location where a large number of such crowds are present, each security guard can support the crowd needing support by going to the location.

Another example of people who need support is exemplified by foreigners. For example, it is preferable to assign a security guard who speaks English to a location where a large number of foreigners using English are distributed. Therefore, by grasping the distribution of foreigners using the information processing apparatus 2000, it is possible to recognize the location to which a security guard is to be deployed, and the language that the security guard is to speak.

In crowd surveillance in a sports match venue, it is preferable to appropriately guide supporters of a losing team. Generally, supporters of a losing team feel frustration. Thus, it is preferable to reduce the frustration of the supporters of the losing team by politely treating the supporters of the losing team such as guiding the supporters of the losing team to leave the sports match venue preferentially over supporters of a winning team. In addition, it is preferable to appropriately separate paths of the supporters such that the supporters of the winning team do not meet the supporters of the winning team.

Therefore, the administrator at the surveillance center or a security guard grasps the distribution of the supporters of the winning team and the supporters of the losing team using the information processing apparatus 2000. By doing so, the administrator or the security guard can grasp whether or not the above various types of guiding are being appropriately performed.

For example, assume that it is grasped using the attribute distribution that the motion of the supporters of the losing team is stagnant whereas an amount of motion of the supporters of the winning team is large. In this case, it is understood that guiding such that "the supporters of the losing team leaves the sports match venue preferentially" is not being appropriately performed. In addition, for example, by recognizing that the supporters of the winning team and the supporters of the losing team are distributed in the same location, it is understood that guiding such that "the supporters of the winning team do not meet the supporters of the winning team" is not being appropriately performed. By causing the security guard to grasp those situations, it is possible to perform appropriate guiding by, for example, changing the layout of security guards.

In addition, the attribute distribution that is grasped using the information processing apparatus 2000 can be used for product sales. For example, in a case where a salesperson sells products at an event venue and the like, it is possible to grasp in which location what goods are going to be sold by grasping the attribute distribution. For example, it is preferable to direct a salesperson having goods for females to a location where a large number of females are distributed.

In addition, in a case where a salesperson sells goods while moving in an event venue, the moving path of the salesperson can be optimized by grasping the attribute distribution. For example, a salesperson having goods for females has more opportunities of selling goods when passing along a path where a large number of females are distributed, than when passing along a path where a large number of males are distributed. Therefore, in such a case, the distribution of females is grasped using the information processing apparatus 2000, and the moving path of the salesperson is decided such that the salesperson always passes through a location where females are distributed. By doing so, a more number of goods can be sold.

The above method of use handles a person as an object. However, as described above, each object may be other than a person. For example, assume that the information processing apparatus 2000 handles a vehicle as an object. In this case, the attribute of each object is, for example, the type of the vehicle (a passenger car, a bus, a truck, a taxi, a tank lorry, or the like).

By handling such an attribute in the information processing apparatus 2000, for example, the distribution of vehicles on the road can be grasped for each type of vehicle. For example, the cause of congestion can be found by grasping such a distribution for a road where congestion is likely to occur. For example, when a phenomenon in which large vehicles that are likely to have a low velocity are concentrated in one place at a certain time period is found, such a phenomenon may be the cause of congestion.

In addition, for example, a location where transportation is insufficient can be determined by seeing the distribution of buses or taxis. Paths through which buses pass can be recognized by seeing a route map and the like of buses. However, only the paths through which the buses may pass can be found on the route map, and it is impossible to grasp the actual distribution of buses at a certain time. Thus, even when the route map is used, it is impossible to grasp a state where transportation such as buses and taxis is insufficient in a specific place at a certain time period. On the other hand, when the information processing apparatus 2000 is used, the actual distribution of buses and taxis can be grasped. Thus, it is possible to grasp a state where transportation is insufficient.

<Method of Grasping Attribute Distribution>

There are various methods of causing the user of the information processing apparatus 2000 to grasp the attribute distribution. For example, the estimating unit 2060 superimposes the calculated attribute distribution on the map of the location of the surveillance target and outputs the superimposed map. For example, this map is displayed on a display device. This display device may be connected to the information processing apparatus 2000, or may be connected to other apparatuses. In the case of displaying the map on the display device that is connected to an apparatus other than the information processing apparatus 2000, the information processing apparatus 2000 transmits information representing the map to the apparatus to which the display device is connected.

Figure 18:
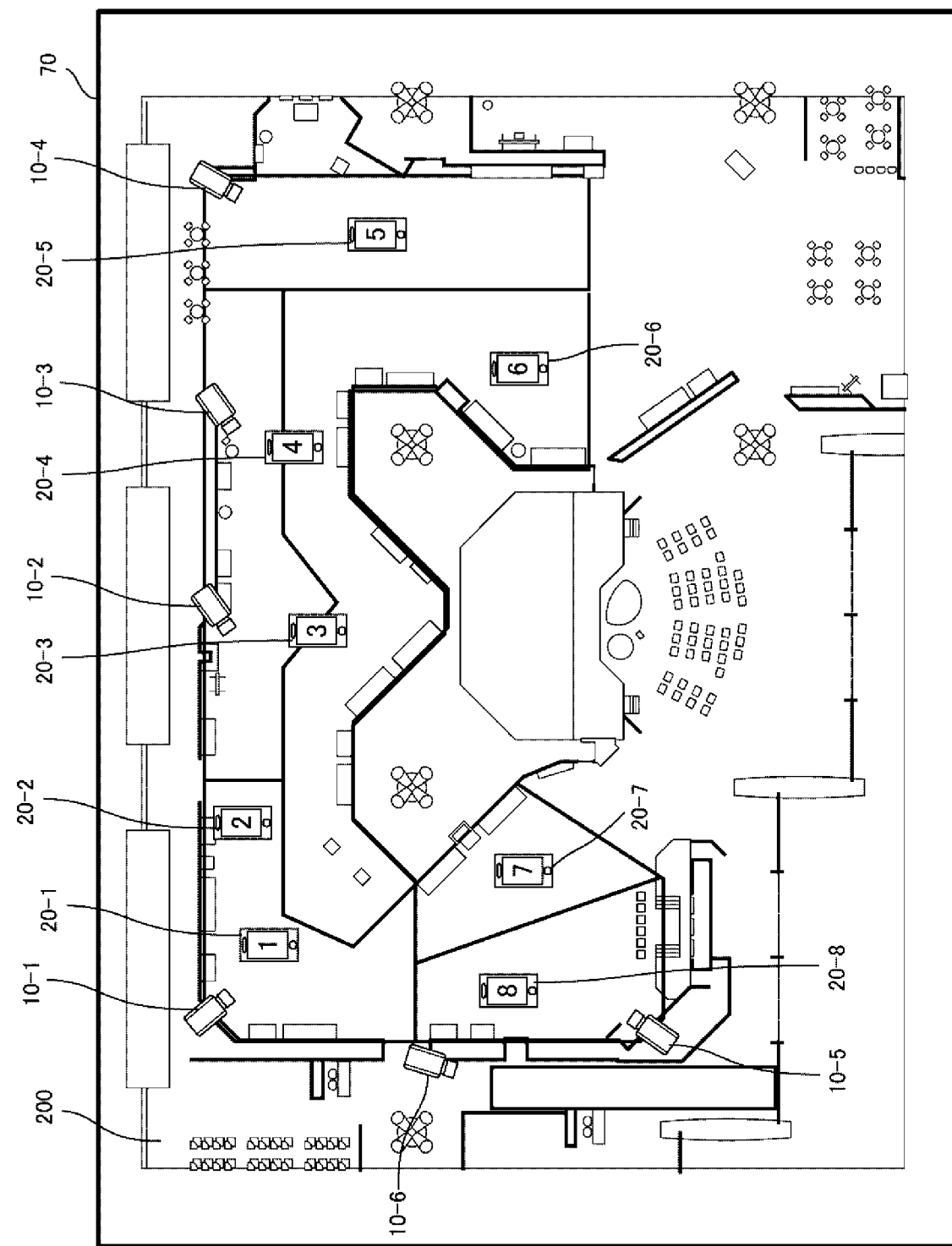
FIG. 18 is a diagram illustrating a map that is displayed on a display device.

FIG. 18 is a diagram illustrating a map 200 that is displayed on a display device 70. The surveillance target in FIG. 18 is the indoor floor. In FIG. 18, a plurality of the fixed cameras 10 are installed. In addition, a plurality of the moving cameras 20 are present. In FIG. 18, the positions of the fixed cameras 10 and the moving cameras 20 are displayed by icons. Note that the positions of the fixed cameras 10 and the positions of the moving cameras 20 on the map 200 can be calculated using positional information of the fixed cameras 10, positional information of the moving cameras 20, and positional information represented by the map 200. In addition, in a case where the arrangement of the fixed cameras 10 is fixed, the positions of the fixed cameras 10 may be illustrated on the map 200 in advance. In addition, information that indicates the type of each moving camera 20 may be displayed together. For example, this information is information with which it is possible to identify whether each moving camera 20 is a moving camera worn by a security guard or a moving camera equipped in a robot. In addition, information related to the security guard or the robot may be provided together. This information is information that indicates whether or not the security guard speaks a specific foreign language, information that indicates whether or not the security or the robot carries a device providing machine translation, or the like.

Figure 19:
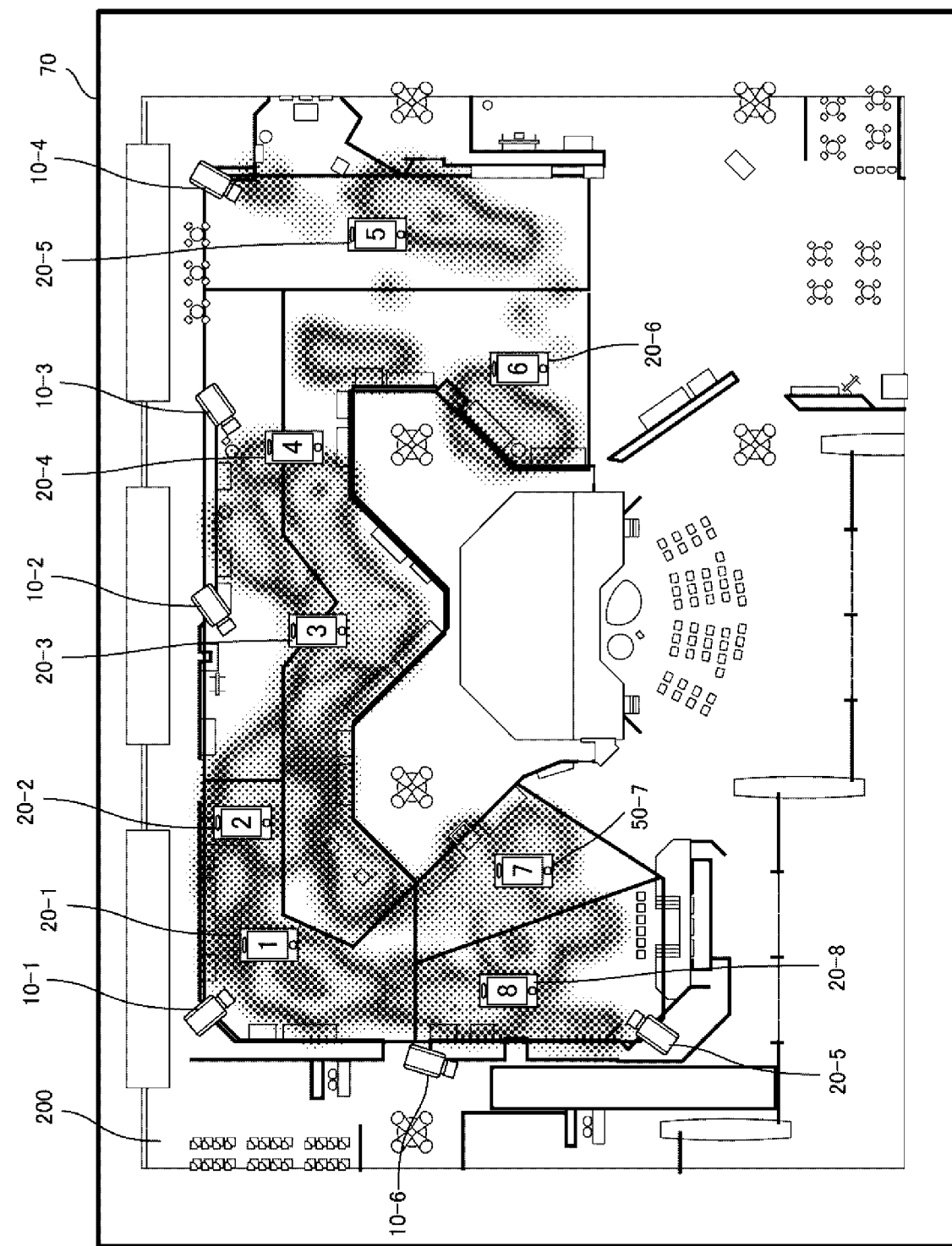
FIG. 19 is a diagram illustrating the map on which an estimated attribute distribution is superimposed.

The information processing apparatus 2000 repeatedly estimates the attribute distribution using the plurality of fixed cameras 10 and the plurality of moving cameras 20. Consequently, the attribute distribution is estimated for various locations on the map 200. FIG. 19 is a diagram illustrating the map 200 on which the estimated attribute distribution is superimposed. In FIG. 19, the attribute distribution is represented by a histogram. This histogram represents the ratio of senior people to other people. A location in dark color represents a location where the ratio of senior people is high. The administrator at the surveillance center, the security guard on site, and the like can grasp the attribute distribution by seeing the map 200. Specifically, it is possible to grasp the location where a large number of senior people are distributed.

<Estimation of Attribute Distribution in Future>

As illustrated using FIGS. 8A and 8B and FIGS. 9A and 9B, based on the flow of the crowd and the attribute distribution of the objects calculated for a certain time, the information processing apparatus 2000 can estimate the attribute distribution of the objects in the estimation range 60 not included in the capturing range 24 at a time in the future from the time. For example, in FIGS. 8A and 8B, the attribute distribution of the objects in the estimation range 60-1 at time t+1 is estimated based on the flow of the crowd in the capturing range 14 of the fixed camera 10 and the attribute distribution of the objects in the capturing range 24 of the moving camera 20 calculated for time t. Thus, according to the information processing apparatus 2000, the attribute distribution in the future can be estimated.

Note that in the example where the estimation range 60 having an infinite area is handled, the attribute distribution that is estimated for time tn in the future is output by setting tn in Expression (5) to a time in the future.

By grasping the attribute distribution in the future, an event that may occur in the future can be dealt with in advance. For example, by estimating the attribute distribution in the future, the security guard and the like can recognize an event in the future such that "a bottleneck occurs due to an increase in the density of people having difficulty in walking in a certain location, and a smooth flow of the crowd is hindered", an event in the future such that "the supporters of the losing team merge with the supporters of the winning team in a certain location", and the like in advance. In such a case, the occurrence of such an event can be prevented in advance by directing the security guard to the location in advance to perform appropriate guiding. In addition, for example, when a salesperson can grasp the attribute distribution in the future such that "a large number of females gather in a certain location", goods can be smoothly sold by making the salesperson to move to the location with goods for females in advance.

Example Embodiment 2

Figure 20:
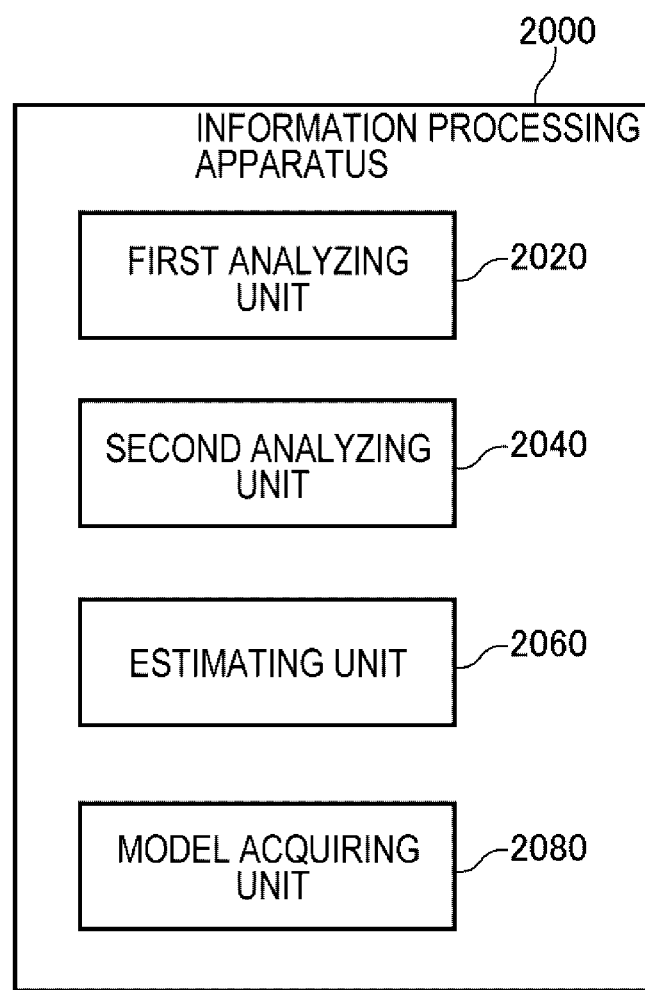
FIG. 20 is a block diagram illustrating an information processing apparatus according to Example Embodiment 2.

FIG. 20 is a block diagram illustrating the information processing apparatus 2000 of Example Embodiment 2. The information processing apparatus 2000 of Example Embodiment 2 has the same function as the information processing apparatus 2000 of Example Embodiment 1 except for the points described below.

The information processing apparatus 2000 of Example Embodiment 2 has a model acquiring unit 2080. The model acquiring unit 2080 acquires a movement model that indicates the feature of the movement of the crowd for each attribute value for a certain attribute. For example, the movement model indicates a different moving velocity for each attribute value.

The estimating unit 2060 uses the attribute distribution calculated for the capturing range of the moving camera 20 at a certain time to calculate the distribution of each object having different attribute values for a subsequent different time. That is, the estimating unit 2060 calculates the attribute distribution of the crowd having each attribute value by considering that the crowd included in the capturing range of the moving camera 20 at a certain time is being divided into a plurality of crowds having different attribute values as time elapses.

Figure 21A:
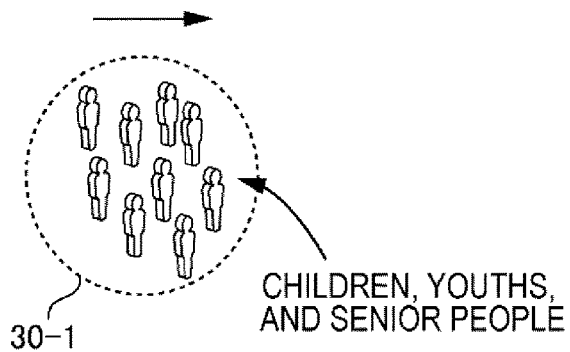
FIGS. 21A, 21B and 21C are diagrams illustrating a scene in which a crowd that is included in a capturing range of a moving camera is divided into a plurality of crowds having different attribute values.
Figure 21B:
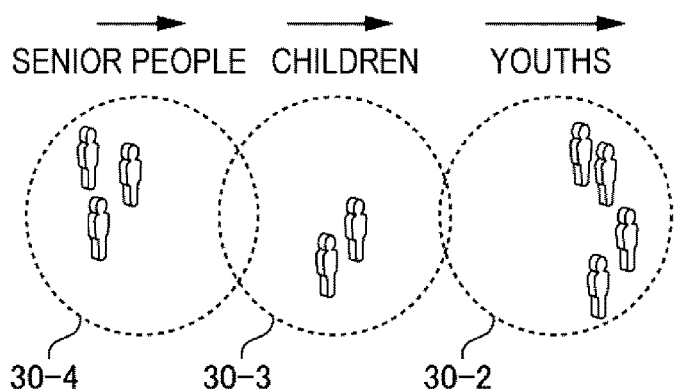
Figure 21C:
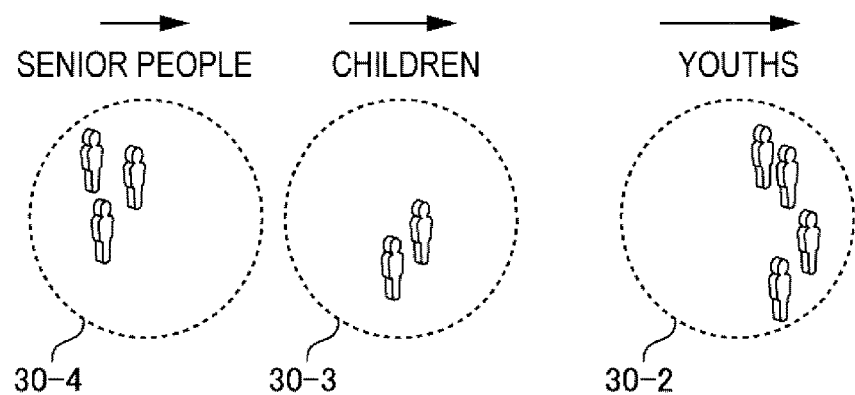

FIGS. 21A, 21B and 21C are diagrams illustrating a scene in which the crowd included in the capturing range of the moving camera 20 is divided into a plurality of crowds having different attribute values. At time t0, people having different attribute values such as a child, a youth, and a senior person are mixed in a crowd 30-1. The moving velocity of each person is increased in the order of a youth, a child, and a senior person. Then, at time t1, a crowd 30-2 of youths, a crowd 30-3 of children, and a crowd 30-4 of senior people in this order move to a position separated from the initial position. At time t2, the distances among the crowds are further increased.

Expression (7) is a specific example of the movement model and is one example of a movement model corresponding to the age bracket. In a case where the magnitude of the flow vector calculated for the whole crowd is v, m(a, v) represents the velocity of the crowd of objects having a as the attribute value of the age bracket.

$$m(a, v) = \begin{cases} 0.9*v & \ldots a = \text{children} \\ v & \ldots a = \text{Adults} \\ 0.8*v & \ldots a = \text{Senior People} \end{cases} \quad (7)$$

Assume that the estimating unit 2060 calculates the attribute distribution for the specified range having an infinite area that is described as one example in Example Embodiment 1. In this case, the estimating unit 2060 uses Expression (8) instead of Expression (2) as an expression for calculating the position xn(tn) of the crowd having a as the attribute value of the attribute A at time tn=t0+nΔt.

$$x_n(t_n) = x_{n-1}(t_{n-1}) + m(a, v(x_{n-1}(t_{n-1}), t_{n-1}))\Delta t \quad (8)$$

Note that the method of acquiring the movement model by the model acquiring unit 2080 is not limited. For example, the movement model may be set in advance in the model acquiring unit 2080, stored in a storage device that can be accessed from the model acquiring unit 2080, or set by the user.

<Hardware Configuration Example>

The information processing apparatus 2000 of Example Embodiment 2 is implemented using the computer 1000 in the same manner as Example Embodiment 1 (refer to FIG. 4). In the present example embodiment, the program modules stored in the storage 1080 further include a program that implements each function described in the present example embodiment.

<Advantageous Effect>

According to the present example embodiment, the flow of the crowd is estimated using the movement model that is set in association with the attribute. Thus, the flow of the crowd can be estimated with higher accuracy. Consequently, the attribute distribution can be estimated with higher accuracy.

Example Embodiment 3

Figure 22:
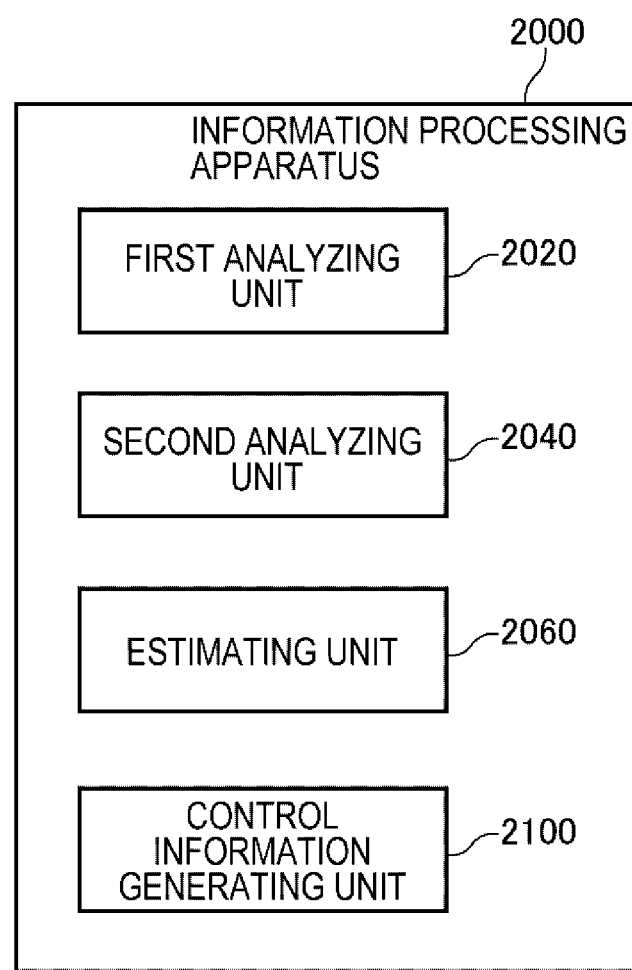
FIG. 22 is a block diagram illustrating an information processing apparatus according to Example Embodiment 3.

FIG. 22 is a block diagram illustrating the information processing apparatus 2000 of Example Embodiment 3. The information processing apparatus 2000 of Example Embodiment 3 has the same function as the information processing apparatus 2000 of Example Embodiment 1 except for the points described below.

The information processing apparatus 2000 of Example Embodiment 3 has a control information generating unit 2100. The control information generating unit 2100 generates control information based on the attribute distribution. The control information generating unit 2100 displays the generated control information on a display device or notifies the user of the generated control information by email and the like. This display device may be connected to the information processing apparatus 2000, or may be connected to other apparatuses. In the case of displaying the control information on the display device that is connected to an apparatus other than the information processing apparatus 2000, the information processing apparatus 2000 transmits the control information to the apparatus to which the display device is connected.

The control information indicates various types of information. For example, the control information indicates a location where a large number of objects having a specific attribute value are present. In this case, the control information generating unit 2100 generates the control information based on the distribution of an attribute related to an attribute value for which support is needed. For example, in a case where the density of objects having a specific attribute value is higher than or equal to a predetermined value in a certain location, the control information generating unit 2100 generates the control information that indicates the location.

The control information generating unit 2100 may generate and provide different control information according to the magnitude of the density of objects. For example, the control information generating unit 2100 generates control information that indicates the degree of necessity of support for each range by superimposing a yellow frame in a range where the degree of the density of objects is medium (for example, higher than or equal to a first threshold and lower than or equal to a second threshold), and superimposing a red frame in a range where the density of objects is high (for example, higher than or equal to the second threshold) on the map 200 illustrated in FIG. 19. Note that in addition to the method of superimposing the frame, the method of provision can use various methods such as a method of superimposing specific color in a region, and a method of flashing the frame. In addition, the first threshold and the second threshold may be stored in advance in the control information generating unit 2100, stored in a storage device that can be accessed from the control information generating unit 2100, or set by the user.

The specific attribute value is an attribute value that represents an object such as a senior person or a person having difficulty in walking who needs support of the security guard and the like. For example, in the case of generating the control information that indicates the location where a large number of senior people are present, the control information generating unit 2100 uses the attribute distribution related to the age bracket.

By generating such control information, the user (security guard and the like) of the information processing apparatus 2000 can recognize a location where a large number of objects having a specific attribute value (for example, objects needing support) are present. Thus, crowd guiding and the like can be more appropriately performed.

Note that the control information may indicate a location where a large number of objects having a specific attribute value are present, and where a security guard is not deployed nearby. In this case, the control information generating unit 2100 uses information representing the layout of security guards in addition to the attribute distribution. The position of each security guard can be determined based on positional information (GPS coordinates and the like) of the portable terminal possessed by each security guard.

By generating such control information, the layout of security guards can be appropriately changed by, for example, directing a security guard to a place of senior people where support is insufficient. Consequently, crowd guiding and the like can be more appropriately performed.

In addition, for example, the control information may indicate a location where the reliability of the attribute distribution is considered to be low. The location where the reliability of the attribute distribution is low is, for example, a location where the moving camera 20 is not present nearby. Since the attribute distribution in a range outside the capturing range of the moving camera 20 is estimated based on the attribute distribution calculated for the capturing range of the moving camera 20, it is considered that the accuracy of the estimated attribute distribution is lower for a location having a longer distance from the moving camera 20. In addition, for example, the location where the reliability of the attribute distribution is low is a location for which data (the first surveillance image 12 and the second surveillance image 22) used for the estimation of the attribute distribution is old data. Since older data used in estimation causes a larger difference between the state of the crowd at the time when the data is generated, and the state of the crowd at the current time, it is considered that the accuracy of the attribute distribution is low.

For example, the control information generating unit 2100 calculates a range of a predetermined distance from the position of each moving camera 20 for a predetermined surveillance location (for example, a location included in the map 200). When a location that is not included in any of the calculated ranges is present in the map 200, the control information generating unit 2100 handles the location as a location where the reliability of the attribute distribution is low. The control information generating unit 2100 generates control information that indicates the location. The predetermined distance may be set in advance in the control information generating unit 2100, stored in the storage device that can be accessed from the control information generating unit 2100, or set by the user.

By generating such control information, it can reduce the location where the reliability of the attribute distribution is low by, for example, directing the security guard possessing the moving camera 20 to the location where the reliability of the attribute distribution is low. Consequently, the reliability of the attribute distribution for the whole surveillance location can be improved, and crowd guiding and the like can be more appropriately performed.

<Hardware Configuration Example>

The information processing apparatus 2000 of Example Embodiment 2 is implemented using the computer 1000 in the same manner as Example Embodiment 1 (refer to FIG. 4). In the present example embodiment, the program modules stored in the storage 1080 further include a program that implements each function described in the present example embodiment.

<Advantageous Effect>

According to the present example embodiment, the above various types of control information are generated. The security guard and the like who are the user of the information processing apparatus 2000 can appropriately perform crowd guiding and the like using the control information.

While the example embodiments of the invention are described heretofore with reference to the drawings, the example embodiments are illustrations of the invention. A combination of the example embodiments, or other various configurations can also be employed.

Hereinafter, reference examples will be appended.

1. An information processing apparatus including:
a first analyzing unit that calculates a flow of a collection of objects in a capturing range of a fixed camera using a first surveillance image, the first surveillance image being generated by the fixed camera, the fixed camera being a camera a position of which is fixed;
a second analyzing unit that calculates a distribution of an attribute of objects in a capturing range of a moving camera using a second surveillance image, the second surveillance image being generated by the moving camera, the moving camera being a camera a position of which is not fixed; and
an estimating unit that estimates the distribution of the attribute of the objects for an estimation range including a range not included in the capturing range of the moving camera based on the distribution of the attribute of the objects in the capturing range of the moving camera and the flow of the collection of objects in the capturing range of the fixed camera.

2. The information processing apparatus according to 1,
in which the estimating unit estimates the distribution of the attribute of the objects in the estimation range by moving the distribution of the attribute of the objects in the capturing range of the moving camera based on the flow of the collection of the objects in the capturing range of the fixed camera.

3. The information processing apparatus according to 2,
in which in a case where the capturing ranges of the fixed camera and the moving camera do not overlap each other, the estimating unit estimates a flow of a collection of objects in the capturing range of the moving camera based on the flow of the collection of the objects in the capturing range of the fixed camera, and estimates the distribution of the attribute of the objects in the estimation range by moving the distribution of the attribute of the objects in the capturing range of the moving camera based on the estimated flow of the collection of the objects.

4. The information processing apparatus according to 2, further including:
a movement model acquiring unit that acquires, in association with an attribute value of an object, a movement model which represents a feature of movement of that object,
in which the estimating unit calculates a flow of each collection of objects having a different attribute value based on the flow of the collection of the objects in the capturing range of the fixed camera and the movement model, and estimates the distribution of the attribute of the objects in the estimation range by moving the distribution of the attribute of the objects in the capturing range of the moving camera based on the flow of each collection of objects having a different attribute value.

5. The information processing apparatus according to any one of 1 to 4,
in which the first analyzing unit calculates density of the collection of the objects in the capturing range of the fixed camera using the first surveillance image, and
the estimating unit estimates the number of objects having each attribute value for the estimation range by calculating density of a collection of objects in the estimation range as the same density as the density of the collection of the objects in the capturing range of the fixed camera.

6. The information processing apparatus according to any one of 1 to 5, further including:
a control information generating unit that generates control information which indicates a location where a large number of objects having a predetermined attribute value are present in the estimated attribute distribution, or a location where reliability of the estimated attribute distribution is low.

7. The information processing apparatus according to any one of 1 to 6, in which a collection of objects captured in the first surveillance image and a collection of objects captured in the second surveillance image have at least a part of objects in common.

8. The information processing apparatus according to any one of 1 to 7,
in which each object is a person, and the attribute of each object is an age bracket, a sex, nationality, a group to which the object belongs, presence of belongings, or whether or not the object is a person having difficulty in walking.

9. The information processing apparatus according to any one of 1 to 8,
in which the capturing range of the fixed camera is wider than the capturing range of the moving camera.

10. A control method executed by a computer, including:
a first analyzing step of calculating a flow of a collection of objects in a capturing range of a fixed camera using a first surveillance image, the first surveillance image being generated by the fixed camera, the fixed camera being a camera a position of which is fixed;
a second analyzing step of calculating a distribution of an attribute of objects in a capturing range of a moving camera using a second surveillance image, the second surveillance image being generated by the moving camera, the moving camera being a camera a position of which is not fixed; and
an estimating step of estimating the distribution of the attribute of the objects for an estimation range including a range not included in the capturing range of the moving camera based on the distribution of the attribute of the objects in the capturing range of the moving camera and the flow of the collection of objects in the capturing range of the fixed camera.

11. The control method according to 10,
in which in the estimating step, the distribution of the attribute of the objects in the estimation range is estimated by moving the distribution of the attribute of the objects in the capturing range of the moving camera based on the flow of the collection of the objects in the capturing range of the fixed camera.

12. The control method according to 11,
in which in a case where the capturing ranges of the fixed camera and the moving camera do not overlap each other, in the estimating step, a flow of a collection of objects in the capturing range of the moving camera is estimated based on the flow of the collection of the objects in the capturing range of the fixed camera, and the distribution of the attribute of the objects in the estimation range is estimated by moving the distribution of the attribute of the objects in the capturing range of the moving camera based on the estimated flow of the collection of the objects.

13. The control method according to 11, further including:
a movement model acquiring step of acquiring, in association with an attribute value of an object, a movement model which represents a feature of movement of that object,
in which in the estimating step, a flow of each collection of objects having a different attribute value is calculated based on the flow of the collection of the objects in the capturing range of the fixed camera and the movement model, and the distribution of the attribute of the objects in the estimation range is estimated by moving the distribution of the attribute of the objects in the capturing range of the moving camera based on the flow of each collection of objects having a different attribute value.

14. The control method according to any one of 10 to 13,
in which in the first analyzing step, density of the collection of the objects in the capturing range of the fixed camera is calculated using the first surveillance image, and
in the estimating step, the number of objects having each attribute value is estimated for the estimation range by calculating density of a collection of objects in the estimation range as the same density as the density of the collection of the objects in the capturing range of the fixed camera.

15. The control method according to any one of 10 to 14,
in which in the first analyzing step, density of the collection of the objects in the capturing range of the fixed camera for a plurality of times is calculated using each of a plurality of the first surveillance images, in the second analyzing step, density of the collection of the objects in the capturing range of the moving camera for a plurality of times is calculated using each of a plurality of the second surveillance images, and
in the estimating step, the distribution of the attribute of the objects in the estimation range is estimated based on the distribution of the attribute of the objects in the capturing range of the moving camera and the flow of the collection of the objects in the capturing range of the fixed camera.

16. The control method according to any one of 10 to 15, further including:
a control information generating step of generating control information which indicates a location where a large number of objects having a predetermined attribute value are present in the estimated attribute distribution, or a location where reliability of the estimated attribute distribution is low.

17. The control method according to any one of 11 to 16,
in which a collection of objects captured in the first surveillance image and a collection of objects captured in the second surveillance image have at least a part of objects in common.

18. The control method according to any one of 10 to 17,
in which each object is a person, and
the attribute of each object is an age bracket, a sex, nationality, a group to which the object belongs, presence of belongings, or whether or not the object is a person having difficulty in walking.

19. The control method according to any one of 10 to 18,
in which the capturing range of the fixed camera is wider than the capturing range of the moving camera.

20. A program that causes a computer to execute each step of the control method according to any one of 10 to 19.

This application claims the benefit of priority from Japanese Patent Application No. 2016-055171 filed on Mar. 18, 2016, the entire disclosure of which is incorporated herein.

The invention claimed is:
1. An information processing system comprising:
at least one memory storing instructions; and
at least one processor coupled to the at least one memory, the at least one processor being configured to execute the instructions to:

calculate a flow of objects in a capturing range of a fixed camera using a surveillance image, the surveillance image being generated by the fixed camera;

calculate a distribution of attributes of objects in an analysis range by analyzing voices that are recorded with an microphone near the analysis range;

perform, with respect to at least one attribute included in the attributes, estimation of a number or a ratio of objects which belong to the at least one attribute and which are present in an estimation range including a range not included in the analysis range after the surveillance image is generated, based on the calculated distribution of the attributes and the calculated flow; and output a result of the estimation.

2. The information processing system according to claim 1, wherein the at least one processor is further configured to
calculate the distribution of the attributes of the objects by analyzing voices uttered by the objects in the analysis range using dictionary data including keywords associated with respective attributes.

3. The information processing system according to claim 1, wherein
the attributes are distinguished by used language; and
the at least one processor is further configured to
calculate the distribution of the attributes of the objects by analyzing used language in the voices.

4. The information processing system according to claim 1, wherein
the analyzing comprises calculating a number of speakers in the voices using a speaker identification technique.

5. An information processing method comprising:
calculating a flow of objects in a capturing range of a fixed camera using a surveillance image, the surveillance image being generated by the fixed camera;
calculating a distribution of attributes of objects in an analysis range by analyzing voices that are recorded with an microphone near the analysis range;
performing, with respect to at least one attribute included in the attributes, estimation of a number or a ratio of objects which belong to the at least one attribute and which are present in an estimation range including a range not included in the analysis range after the surveillance image is generated, based on the calculated distribution of the attributes and the calculated flow; and
outputting a result of the estimation.

6. The information processing method according to claim 5, further comprising:
calculating the distribution of the attributes of the objects by analyzing voices uttered by the objects in the analysis range using dictionary data including keywords associated with respective attributes.

7. The information processing method according to claim 5, wherein
the attributes are distinguished by used language; and
the information processing method further comprises
calculating the distribution of the attributes of the objects by analyzing used language in the voices.

8. The information processing method according to claim 5, wherein
the analyzing comprises calculating a number of speakers in the voices using a speaker identification technique.

9. A non-transitory computer-readable storage medium storing a program that causes a computer to execute:
calculating a flow of objects in a capturing range of a fixed camera using a surveillance image, the surveillance image being generated by the fixed camera;
calculating a distribution of attributes of objects in an analysis range by analyzing voices that are recorded with an microphone near the analysis range;
performing, with respect to at least one attribute included in the attributes, estimation of a number or a ratio of objects which belong to the at least one attribute and which are present in an estimation range including a range not included in the analysis range after the surveillance image is generated, based on the calculated distribution of the attributes and the calculated flow; and
outputting a result of the estimation.

10. The storage medium according to claim 9, wherein the program further causes the computer to execute
calculating the distribution of the attributes of the objects by analyzing voices uttered by the objects in the analysis range using dictionary data including keywords associated with respective attributes.

11. The storage medium according to claim 9, wherein
the attributes are distinguished by used language; and
the program further causes the computer to execute:
calculating the distribution of the attributes of the objects by analyzing used language in the voices.

12. The storage medium according to claim 9, wherein
the analyzing comprises calculating a number of speakers in the voices using a speaker identification technique.

* * * * *